Nov. 3, 1959 C. E. LOMAX 2,911,480

SMALL SUBOFFICE TELEPHONE SYSTEM

Filed Dec. 31, 1957 9 Sheets-Sheet 1

INVENTOR.
CLARENCE E. LOMAX

BY

C. R. Gulbrandsen

ATTY.

INVENTOR.
CLARENCE E. LOMAX

BY C. A. Gulbrandsen
ATTY.

ALLOTTER 300 & 300'

INVENTOR.
CLARENCE E. LOMAX
BY
C. A. Gilbrandsen
ATTY.

Nov. 3, 1959 C. E. LOMAX 2,911,480
SMALL SUBOFFICE TELEPHONE SYSTEM
Filed Dec. 31, 1957 9 Sheets-Sheet 4
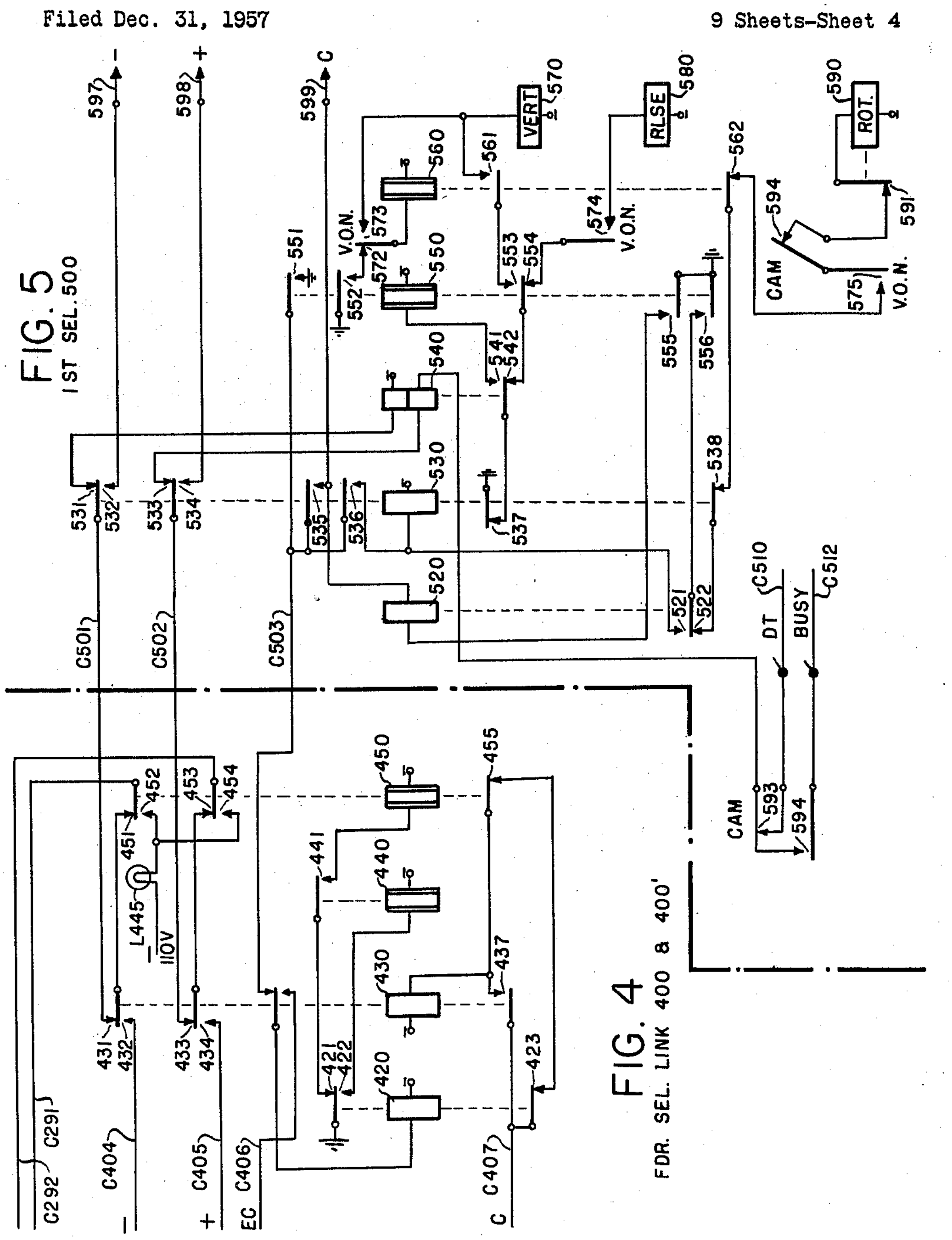
FIG. 5 1ST SEL. 500, FIG. 4 FDR. SEL. LINK 400 & 400'
INVENTOR.
CLARENCE E. LOMAX
BY
C. A. Gulbrandsen
ATTY.

INVENTOR.
CLARENCE E. LOMAX
BY C. A. Gulbrandsen
ATTY.

Nov. 3, 1959 C. E. LOMAX 2,911,480

SMALL SUBOFFICE TELEPHONE SYSTEM

Filed Dec. 31, 1957 9 Sheets-Sheet 6

SEL.-RPTR 700

INVENTOR.
CLARENCE E. LOMAX

BY
C. A. Gulbrandsen
ATTY.

CONNECTOR 800

INVENTOR.
CLARENCE E. LOMAX
BY C. A. Gulbrandsen
ATTY.

Nov. 3, 1959 C. E. LOMAX 2,911,480

SMALL SUBOFFICE TELEPHONE SYSTEM

Filed Dec. 31, 1957 9 Sheets-Sheet 8

INVENTOR.
CLARENCE E. LOMAX
BY C. A. Gulbrandsen
ATTY.

INVENTOR.
CLARENCE E. LOMAX
BY C. A. Gulbransen
ATTY.

United States Patent Office 2,911,480

Patented Nov. 3, 1959

2,911,480

SMALL SUBOFFICE TELEPHONE SYSTEM

Clarence E. Lomax, Hastings, Nebr., assignor to General Telephone Laboratories, Incorporated, Northlake, Ill., a corporation of Delaware Application December 31, 1957, Serial No. 706,380

21 Claims. (Cl. 179—26)

The present invention relates to automatic telephone systems in general, particularly to small suboffice trunking arrangements for enabling connections between subscribers therein via a main exchange.

It is an object of the present invention to provide small suboffices having trunks to a main exchange and in which the suboffice subscribers have the same number of digits as the regular main exchange subscriber lines.

Another object of this invention is to provide a small suboffice trunking system whereby no ringing or tone machines are provided in the suboffices.

Another object of the present invention of the above type character wherein, the following means are all provided at the main exchange rather than the suboffice exchanges; the application, selection and cut-off of the ringing current, busy tone, ring-back tone, and talking battery for called and calling parties.

A feature of the present invention resides in a ringing selector repeater at the main exchange which responds to a fourth dialled digit to select the desired suboffice, responds to the fifth digit to select the desired ringing frequency, and repeats the sixth and seventh digit to the seized suboffice connector.

Figures 1, 1A, 1B, 1C:
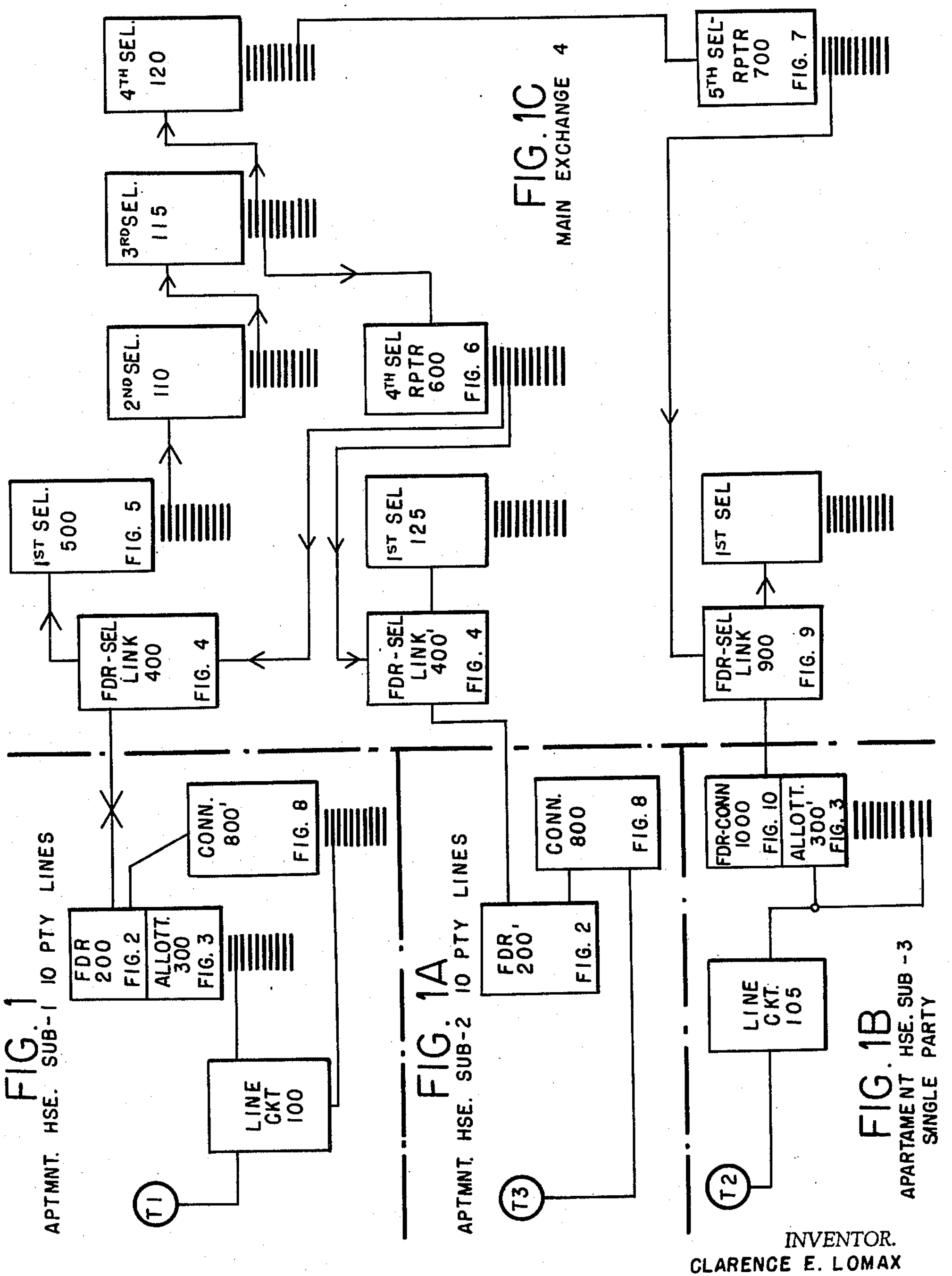

Other objects and features will become apparent from a perusal of the following specification taken in conjunction with the accompanying drawings, in which:

Figs. 1, 1A, 1B, and 1C show a trunking diagram of the present telephone system, and more particularly;

Figs. 1 and 1A represent a ten party apartment house having suboffice exchanges 1 and 2; Fig. 1B represents a single party apartment house suboffice exchange 3; and Fig. 1C represents the main exchange 4.

Figure 2:
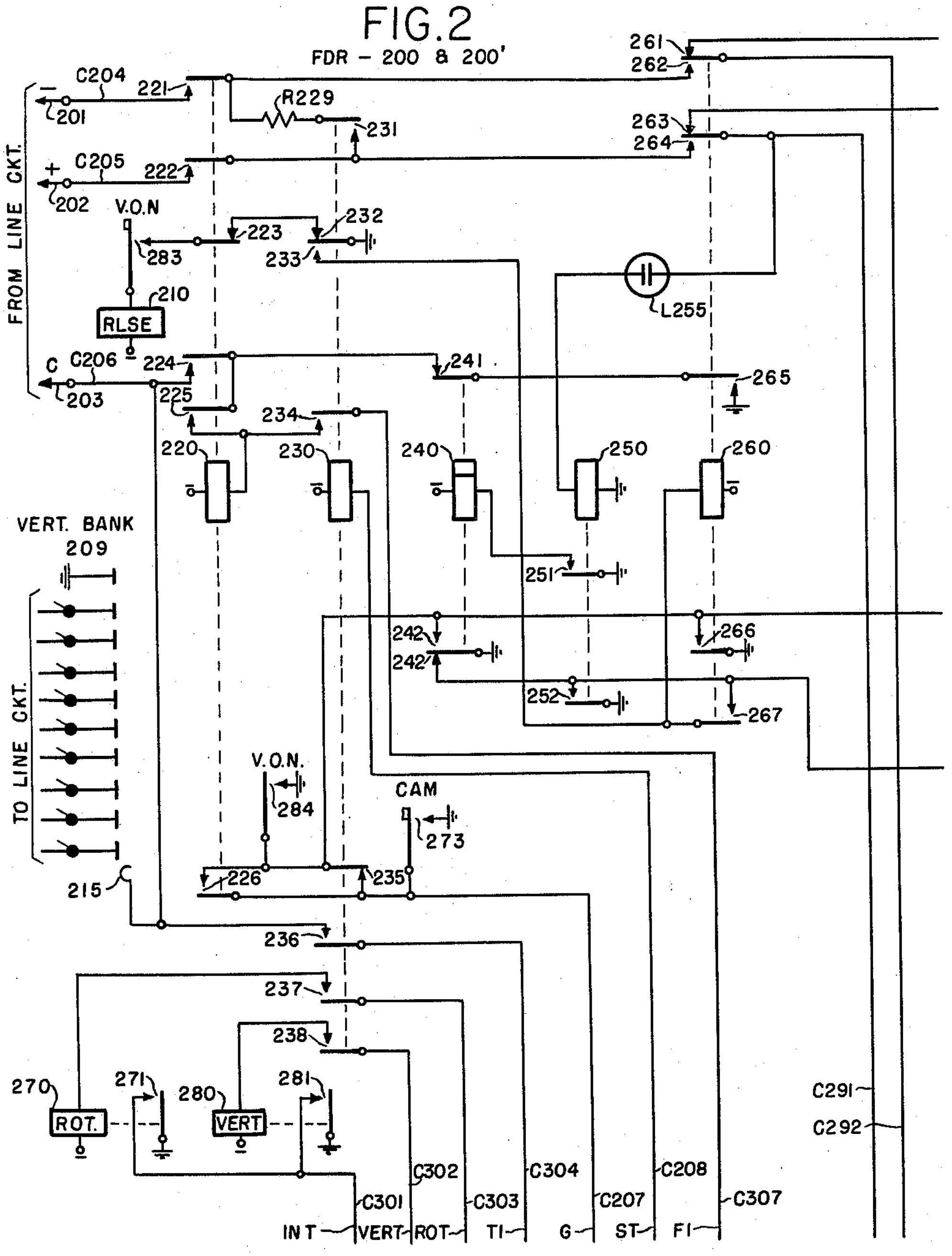

Fig. 2 shows line finders 200 and 200' utilized in suboffices 1 and 2 respectively.

Figure 3:
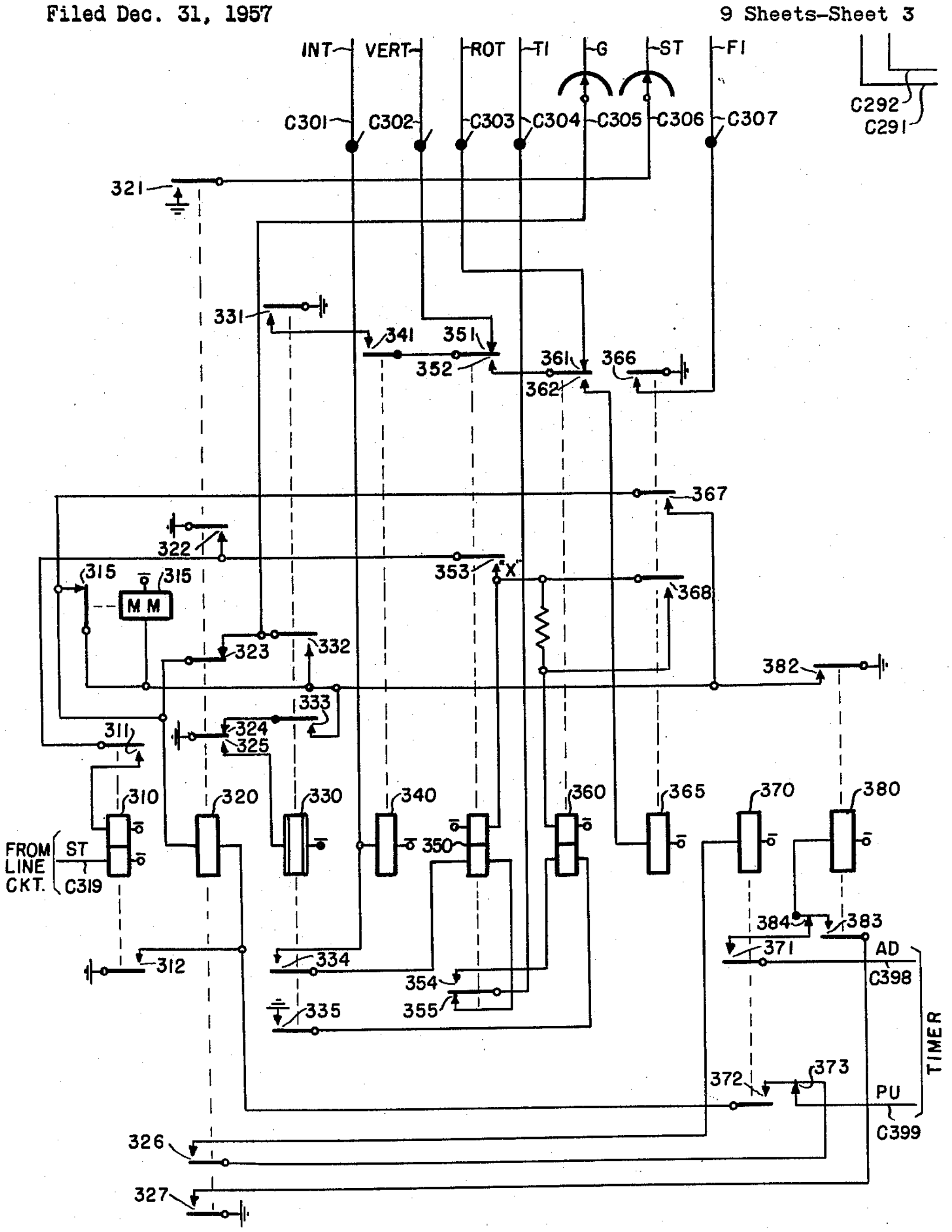

Fig. 3 shows allotters 300 and 300' utilized in suboffice 1 and suboffice 3 respectively.

Fig. 4 shows finder-selector links 400 and 400' utilized in the main exchange 4.

Fig. 5 shows a special selector 500 utilized in the main exchange 4.

Figure 6:
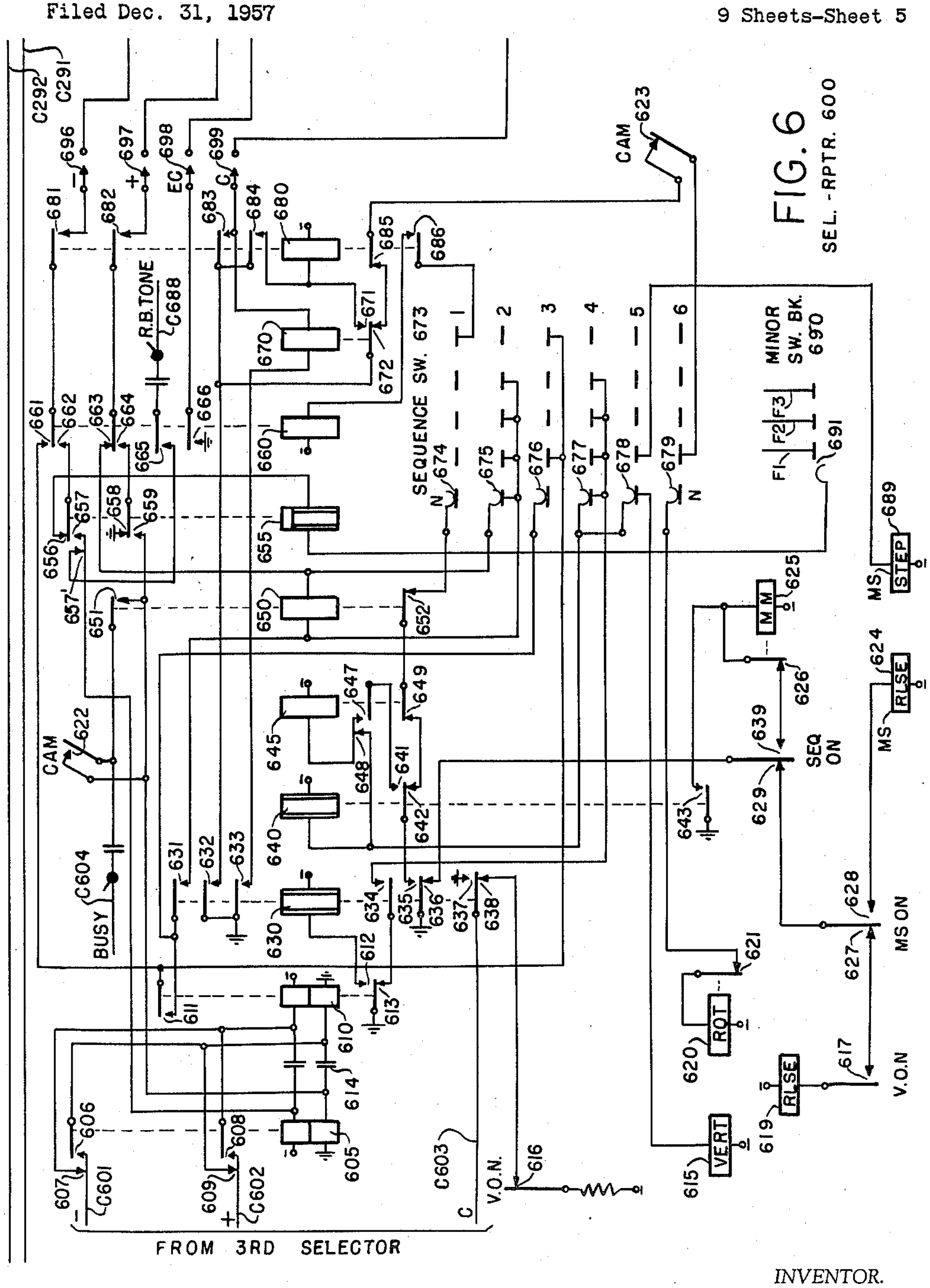
Figure 7:
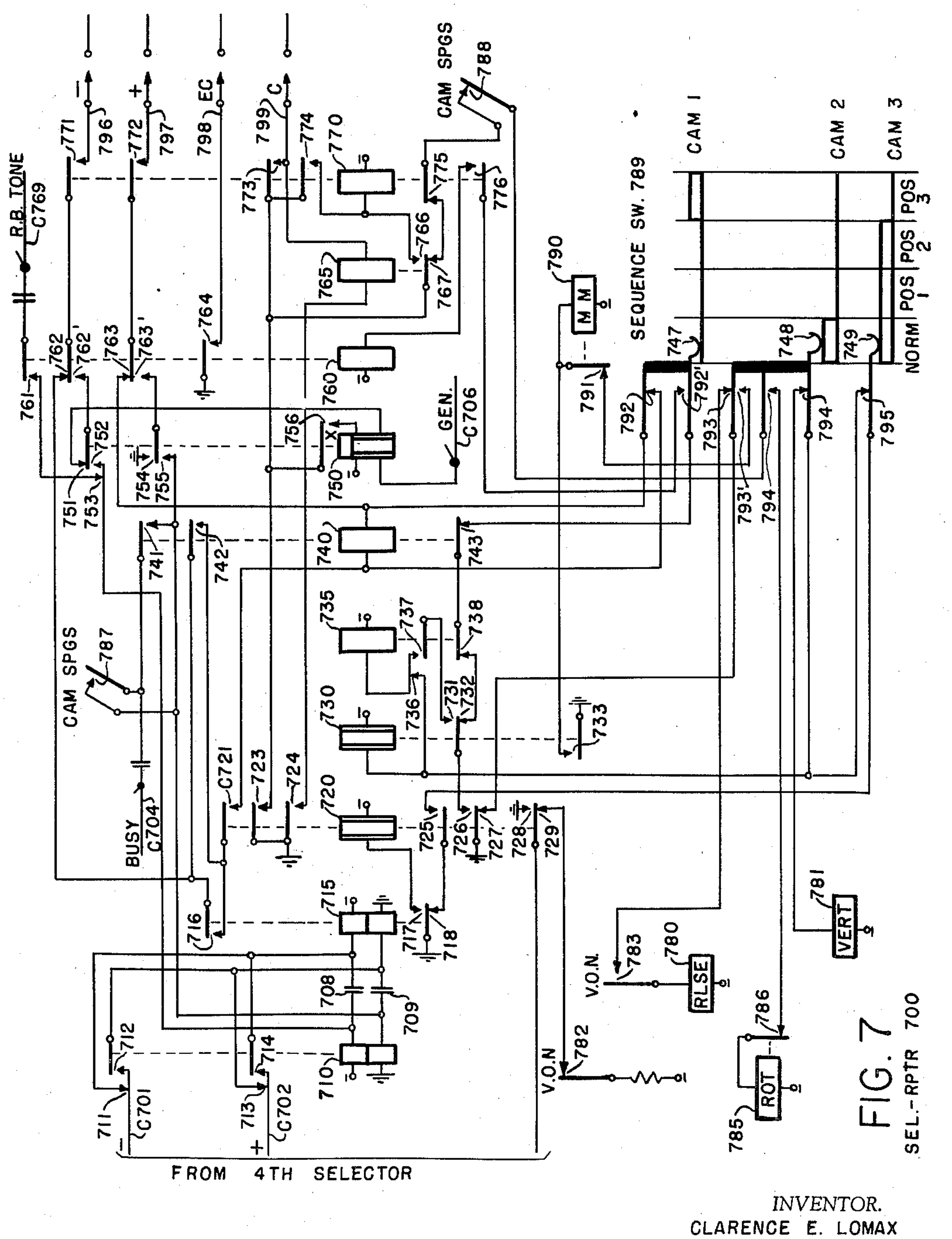

Figs. 6 and 7 show special selector-repeaters 600 and 700 respectively utilized in the main exchange 4.

Figure 8:
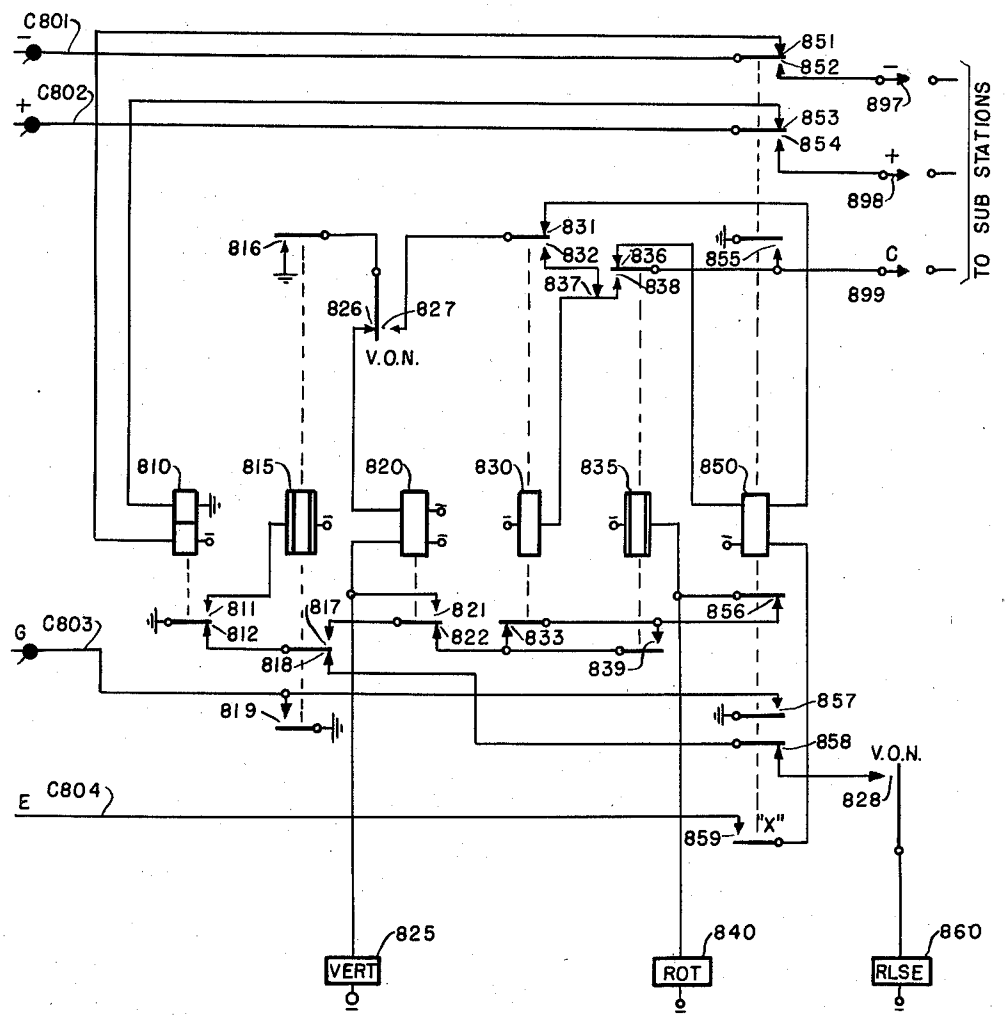

Fig. 8 shows connectors 800 and 800' utilized in suboffice 2 and suboffice 1 respectively.

Figure 9:
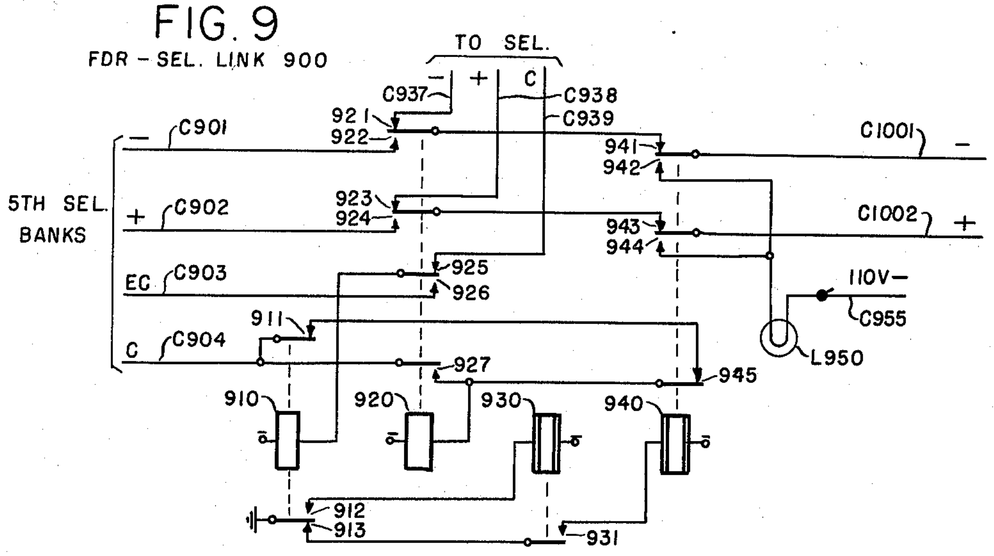
Figure 10:
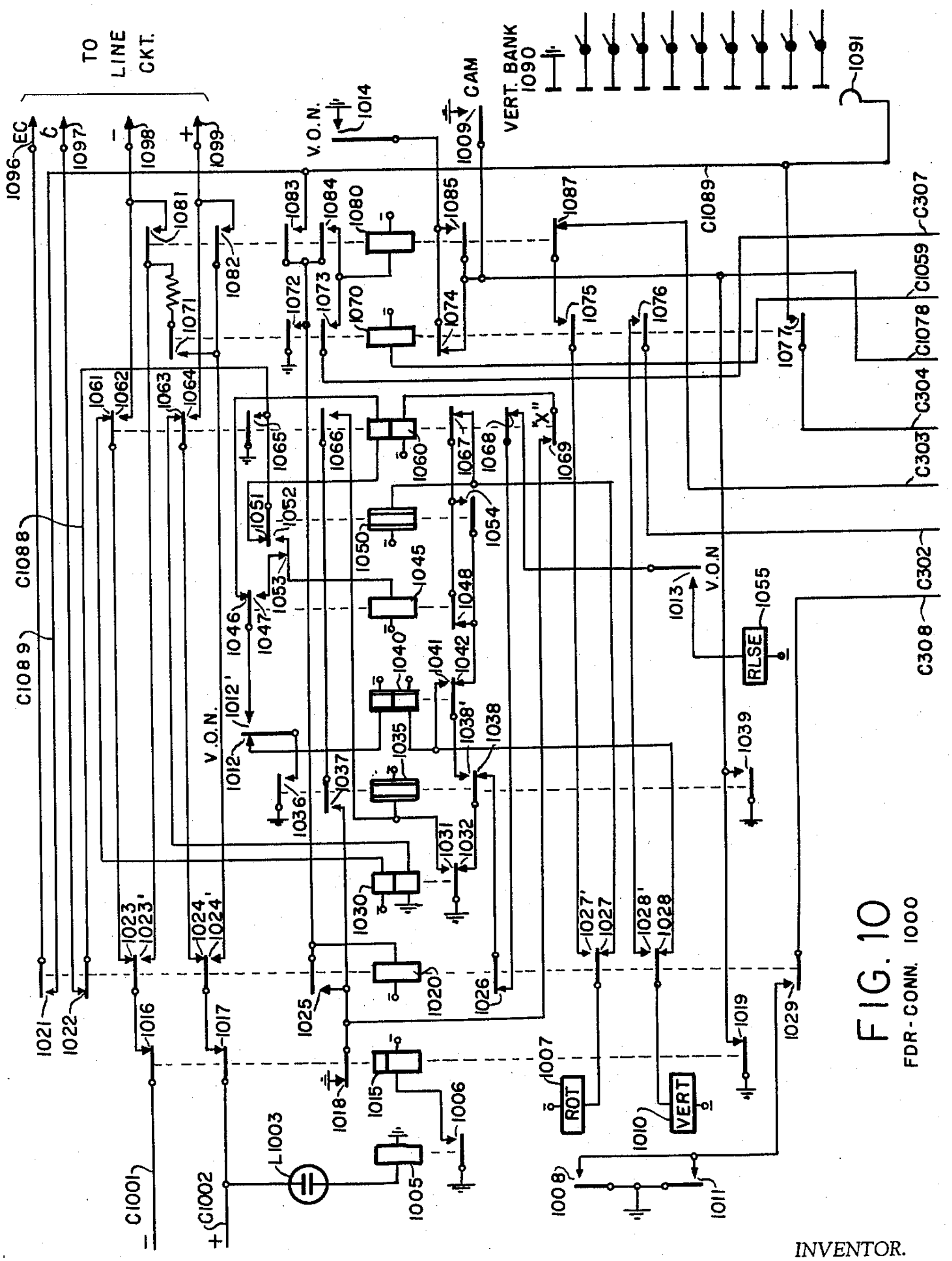

Figs. 9 and 10 show finder-selectors 900 and 1000 utilized in the main exchange 4 and in the suboffice 3 respectively.

Referring briefly to the trunking diagram, each apartment house suboffice exchange comprises, line circuits, finders, allotters, and connectors. The main exchange 4 comprises the conventional selectors and selector-repeaters including means therein to provide transmission battery for calling and called subscribers, ringing frequencies, ring-back tone, busy tone, and dial tone for said subscribers in the suboffice exchanges.

When a subscriber such as T1 in suboffice 1 makes an outgoing call, say to subscriber T3 in suboffice 2, a line circuit 100, will operate to extend the loop to a first selector 500 (Fig. 5), via allotter 300, line finder 200 (Fig. 2), and a finder-selector link 400 (Fig. 4) in a manner to be described in the ensuing description. Selector 500 would in turn seize a second selector 110 upon receipt of digital impulses, and so on until a selector-repeater 600 (Fig. 6) is seized in a conventional manner. Selector-repeater 600 will in turn seize an idle finder-selector link 400' (Fig. 4) and an idle connector 800 (Fig. 8) upon receipt of the next dialled digit. The next dialled digit will not be repeated by selector-repeater 600 due to a shunt placed across the loop upon seizing the finder-selector link 400' by selector-repeater 600. Instead, a minor switch 690 in selector-repeater 600 will respond to the digit dialled and choose a ringing frequency to be used. A sequence switch 673 in the selector-repeater 600 responds one step for each digit dialled herein to maintain the prevention of the extension of the loop circuit to the connector until the last digit is dialled. The next digit dialled (the sixth digit) however, will be repeated by selector-repeater 600 to connector 800, to vertically step the wipers therein accordingly to the numerical value of the digit. The last digit dialled will also be repeated by selector-repeater 600 to rotate the connector wipers into the level according to the numerical value of the digit. If the called party is busy, a busy test relay 650 in selector-repeater 600 will operate to transmit busy tone to the calling party, or if the calling party is found idle, a switch-through relay 660 will operate to extend the loop to the called party. When the last digit was dialled the sequence switch wipers were stepped to the last bank contact thereon to then, and only then, permit the extension of the loop circuit. At this time selector-repeater 600 in the main exchange 4 will transmit the ringing frequency to the called party and also return ring-bank tone to the calling party.

Upon the termination of the above mentioned call, finder-selector link 400 will transmit a 110 volt battery surge to release the finder 200 after the calling party hangs up. This will be described in greater detail in the ensuing detailed description.

Upon subscriber T1 in suboffice 1 attempting a call to subscriber T2 in suboffice 3, a selector-repeater 700 (Fig. 7) is seized after dialling the first four digits in a manner described (via selectors 500, 110, 115 and 120). Selector-repeater 700 will operate in a manner similar to selector-repeater 600 with the exception that no ringing frequency is chosen for single party lines and only three digits are dialled herein instead of the four digits into selector-repeater 600.

A detailed description will now follow.

*Call from subscriber T1 to subscriber T2*

Assuming that a subscriber T1 at the apartment house suboffice exchange 1 (Fig. 1), attempts to call subscriber T2 in apartment house suboffice exchange 3 (Fig. 1B), the calling party will initially remove the handset. The closure of the line loop will operate a line circuit 100, which will operate the line relay (not shown) therein. The line relay will close ground over start lead C319 (Fig. 3) to allotter 300, via the windings of relay 310 to battery. The allotter 300 is now ready for finder hunting.

The operation of relay 310 at contacts 311 prepares a locking circuit for this relay. At contacts 312, a multiple circuit is closed to relay 320 and motor magnet 315 in series; the circuit extending from battery, winding of motor magnet 315, contacts 316, winding of relay 320, to contacts 312 and ground. Due to the resistance in the winding of relay 320, motor magnet 315 will not operate over this circuit however, relay 320 will operate. Assuming the wipers 391 and 392 are resting on contacts extending to an idle line finder, such as finder 200, at contacts 321 relay 320 closes a circuit to operate relay 230 in finder 200; the circuit extending from ground, contacts 321, conductor C306, wiper 392, fifth contact of the bank contacts, start conductor C208, winding of relay 230, to battery. At contacts 322, an obvious holding circuit is closed to relay 310 through its upper windings. At contacts 323 ground is forwarded to the guard conductor C803 to mark connector 800 busy to incoming calls to subscriber T1. At contacts 325 an obvious circuit is closed to slow-to-release relay 330. At contacts 326, relay 370 is closed to the timer. At contacts 327, a locking circuit is prepared to relay 380. Relay 330 operates, and at contacts 331 prepares a circuit to vertical magnet 280 of line finder 200. At contacts 332 and 333, circuits are prepared to motor magnet 315. At contacts 334 a circuit is prepared to relay 350, and at contacts 335 a circuit is prepared to relay 360.

The operation of relay 230 in finder 200, closes a resistance R229 across loop conductors C257 and 258 at contacts 231. At contacts 233 an obvious circuit is closed to relay 260. At contacts 234 a circuit is prepared to relay 220. At contacts 236 a circuit is closed to wiper 215. At contacts 237 a circuit is prepared to rotary magnet 270. At contacts 238 a circuit is closed to vertical magnet 280. The operation of relay 260 at contacts 262 and 264 extends the loop from the finder to incoming selector 500 to operate relay 540 (Fig. 5); the circuit extending from battery, winding of relay 540 (Fig. 5), contacts 531, conductor C501, contacts 431 and 451 (Fig. 4) of finder selector link 400, conductor C291 (Figs. 4, 3, 2), contacts 264, positive conductor C258, contacts 231, resistance R229, negative conductor C257, contacts 262, conductor C292 (Figs. 2, 3 and 4), contacts 453, 433, conductor C502, contacts 533, lower winding of relay 540, cam contacts 593, conductor C510 to dial tone and ground. Also through the last mentioned circuit, battery is returned through lamp L255 and relay 250 to ground, however the high resistance in lamp L255 prevents relay 250 from operating. At contacts 265 a locking circuit is prepared to relay 220. At contacts 266 ground is placed on guard conductor C803 of connector 800′ (Fig. 8). At contacts 267, relay 260 locks operated via contacts 243. Thus, the incoming selector 500 has been seized prior to the seizure of the line circuit 100 by the finder 200.

The operation of vertical magnet 280 closes its interrupter contacts 281 to complete an obvious circuit to relay 340 via interrupter conductor C301. Relay 340 operates, opens contacts 341 and the circuit to vertical magnet 280. Vertical magnet 280 restores and steps the wipers 215, 201, 202, and 203 one step. Vertical magnet 280 and relay 340 will intermittently operate until ground is found by vertical wiper 215 on one of the levels of the vertical bank 209, placed thereon by the line circuit. Upon the wipers taking the first vertical step, the VON springs operate, whereby at VON contacts 282 a circuit is prepared to release magnet 210. At VON contacts 284 a multiple ground is added to guard lead C803 of connector 800′. Upon the wiper 215 finding the grounded bank level, a circuit is closed to operate relay 350; the circuit extending from the ground, wiper 215, contacts 236, conductor C304, contacts 355, lower winding of relay 350, contacts 334, winding of relay 340, to battery. At contacts 352, relay 350 closes a circuit to rotary magnet 270; the circuit extending from battery, winding of rotary magnet 270, contacts 237, conductor C303, contacts 361, 352, 341, 331, to ground. At contacts 353, relay 350 locks operated through its upper windings from ground at contacts 322. At contacts 354 a circuit is prepared to relay 360.

The operation of rotary magnet 270, closes its interrupter contacts 271 to complete a circuit to relay 340. Relay 340 operates to open contacts 341 to restore rotary magnet 270. The restoration of rotary magnet 270 rotates the wipers 215, 201, 202, and 203 one step into the level vertically stepped to. and also opens contacts 271 to restore relay 340. The restoration of relay 340 again closes contacts 341 to energize the rotary magnet 270. This sequence of operations continues, to rotate the wipers until battery is found on control wiper 203 denoting the line circuit 100 of the calling subscriber T1. It will be noted here that when vertical wiper 215 took its first step rotary, ground was removed from the wiper 215 since no further contacts are engaged by this wiper. When wiper 203 engages the bank contact extending to line circuit 100, battery is returned to operate relay 360; the circuit extending from battery, wiper 203, conductor C206, contacts 236, conductor C304, contacts 354, lower winding of relay 360, contacts 335, to ground. At contacts 361, relay 360 opens the circuit to rotary magnet 270. Rotary magnet 270 restores opening contacts 271 to restore relay 340. The restoration of relay 340, at contacts 341 closes a circuit to operate relay 365; the circuit extending from ground, contacts 331, 341, 352, 362, winding of relay 365 to battery. The operation of relay 365 at contacts 366 close a circuit to operate relay 220 via conductor C307 and contacts 234. At contacts 367 a circuit is prepared to motor magnet 315. At contacts 368, relay 360 locks operated through its upper winding.

When wiper 203 engaged the bank contact of line circuit 100, the cut-off relay (not shown) in the line circuit operated, which in turn, restored the line relay therein. The restoration of the line relay removes the ground from the start lead C310 however, relay 310 remains operated over the mentioned locking circuit.

After a predetermined time interval the timer will transmit a ground pulse via conductor C399 to momentarily operate relay 370 over a circuit including contacts 373 and 326. The operation of relay 370 at contacts 372 closes a holding circuit for this relay via ground at contacts 312. At contacts 371 a circuit is closed from the timer to relay 380, wherein a second ground pulse will be transmitted over conductor C398 to momentarily operate relay 380 over a circuit including contacts 384. The operation of relay 380 at contacts 383 locks this relay operated via contacts 327. At contacts 382, an obvious circuit is closed to energize motor magnet 315. The energization of motor magnet 315 opens its interrupter contacts 316 to open the circuit to relay 320. Relay 320 restores and at contacts 321 opens the circuit to restore relay 230. At contacts 322 the circuits to relays 310, 350 and 360 are opened. At contacts 323, ground is removed from the guard lead C803 of connector 800′ however, at contacts 324 a second ground is returned. At contacts 325, the circuit to relay 330 is opened however, relay 330 is slow-to-release and remains operated for a short time. At contacts 326 the circuit to relay 370 is opened causing its restoration. At contacts 327 the circuit to relay 380 is opened causing its release. Providing no other calls are being attempted where a ground would exist on start lead C319, relay 310 will restore, whereby at contacts 311 the previously opened locking circuit is further opened. At contacts 312 the circuit to relay 320 is further opened. Relay 350 restores, opening contacts 352 to restore relay 365. Relay 360 restores. Relay 365 restores, opening contacts 366 extending to relay 220. The restoration of relay 380 at contacts 382 opens the circuit to motor magnet 315. After a short interval, relay 330 restores opening contacts 332 and 333 to remove one of the multiple grounds from the guard lead C803 of connector 800′. The restoration of motor magnet 315 steps the wipers 391 and 392 one step to disengage with finder 200, and sets up a call with a finder on the sixth contact providing it is found idle.

Prior to the disconnection between allotter 300 and finder 200, relay 200 operated and relay 260 locked operated as previously described. At contacts 221 and 222 the loop circuit from the calling party is extended to the first selector 500 and relay 540 (Fig. 5), the circuit extending from battery, upper winding of relay 540, contacts 531, conductor C501, contacts 431 (Fig. 4), 451, conductor C291 (Figs. 3, and 2), contacts 264, positive conductor C258, contacts 222, conductor C205, wiper 202, bank contact, line circuit 100, subscriber T10's handset, wiper 201, conductor C204, contacts 221, negative conductor C257, contacts 262, conductor C292, contacts 453, 433, conductor C502, contacts 533, lower winding of relay 540, cam contacts 593, conductor C510 to dial tone and ground. At contacts 224 and 225, relay 220 locks operated to ground at contacts 265. At contacts 223 the prepared circuit to release magnet 210 is opened. It will be recalled that upon the disconnection between allotter 300 and finder 200 the circuit to relay 230 was opened, restoring relay 230. At contacts 235, ground from VON contacts 284 is extended via conductor C207 to mark finder 200 busy to allotter 300 on the fifth bank contact. At contacts 231 the resistance R229 is removed from the loop circuit to permit operation of relay 540 in the first selector 500.

Upon the extension of the loop circuit to first selector 500 and the removal of resistance R229 from the loop, relay 540 operates to close contacts 541 to complete an obvious circuit to relay 550. Relay 550 operates and at contacts 551 grounds conductor C503 extending to finder selector link 400, and via contacts 436 operates relay 420. At contacts 552 an obvious circuit is closed to relay 560. At contacts 553 a circuit is prepared to vertical magnet 570. Relay 560 operates closing contacts 561 to further prepare a circuit to vertical magnet 570.

The operation of relay 420 in finder-selector link 400 closes contacts 422 to complete an obvious circuit to relay 440. At contacts 423 a prepared circuit to relay 430 is opened to prevent operation thereof from incoming selector banks. The operation of relay 440 at contacts 441 prepares a circuit to relay 450.

Upon receipt of dial tone subscriber T1 will prepare to dial. Assuming the first digit dialled is the digit "8," relay 540 will intermittently restore and operate eight times upon receipt of the digital inpulse series. Upon the first restoration of relay 540, contacts 541 opens the circuit to relay 550 however, relay 550 is slow-to-release and remains operated throughout the impulse series. At contacts 542 a circuit is closed to energize vertical magnet 570. The reoperation of relay 540 opens the circuit to vertical magnet 570 to cause deenergization thereof. Thus, for each pulse received by vertical magnet 570 the wipers 597, 598, and 599 will take one step vertically. Upon the wipers taking their first vertical step, the VON springs will operate. VON contacts 572 opens the circuit to relay 560 however, at VON contacts 573 relay 560 remains operated in series with the vertical magnet 570 throughout the impulse series because relay 560 is of the slow-to-release type. At VON contacts 574 a circuit is prepared to release magnet 580. At VON contacts 575 a circuit is prepared to rotary magnet 590.

At the termination of the eight impulses the wipers will be standing on the eighth level of the bank contacts, and relay 540 will be again fully operated to restore relay 560 after a short duration and deenergize vertical magnet 570. The restoration of relay 560 at contacts 562 closes a circuit to rotary magnet 590; the circuit extending from ground, contacts 556, 522, 538, 562, 575, 594, 591, winding of rotary magnet 590 to battery. Rotary magnet 590 energizes, opening its interrupter contacts 591 to open the operating circuit to and deenergize the rotary magnet. The deenergization of rotary magnet 590 recloses its interrupter contacts 591 to again close the circuit, whereby this sequence of operations rotates the wipers over the eighth level of bank contacts until an idle second selector is found on one of the bank contacts. When a second selector is found idle, battery will be encountered by control wiper 599 to operate relay 520 over an obvious circuit. The operation of relay 520 at contacts 522 opens the circuit to the rotary magnet causing the deenergization thereof. At contacts 521, an obvious circuit is closed to operate relay 530. The operation of relay 530 at contacts 532 and 534 extends the loop circuit to the seized second selector. At contacts 531 and 533, the circuit to relay 540 is opened, causing the release thereof. At contacts 535 and 536 a locking circuit is closed via wiper 599 to relays 530 and 420 in selector-repeater 400 upon a change in polarity (ground) from the second selector in a well-known manner. At contacts 537 the circuit to slow-to-release relay 550 is opened, causing its release after a short duration. The restoration of relay 550 after a short duration opens contacts 551 to remove the busy ground to selector-repeater 400 however, the ground received from wiper 599 and via contacts 535 maintains selector 500 busy to incoming calls from selector-repeater 400. The opening of contacts 555 and the change in polarity from the succeeding switch restores relay 520.

In the event that no idle second selector was found during rotation of the wipers, the wipers would rotate to the overflow or eleventh rotary position to operate the cam springs. At cam contacts 594 the circuit to rotary magnet 590 would be opened to cease rotation of the wipers. At cam contacts 593 dial tone would be removed from the loop circuit, and at cam contacts 594 busy tone from conductor C512 would be transmitted back to the calling party notifying him of the busy condition. The calling party T1 would then hang up and release the equipment in a manner to be subsequently described in the ensuing description.

Assuming second selector 110 (Fig. 1C) in the main exchange is seized in the manner described by first selector 500. Selector 110 being of the conventional type will then receive the next dialled series of digital impulses, and step its wipers correspondingly to seize an idle third selector in a well-known manner. It will also be assumed that third selector 115 and fourth selector 120 have been seized responsive to dialling the digits therefor in a well-known manner. Upon receipt of a series of digital impulses, it will further be assumed that fourth selector 120 seizes idle selector-repeater 700 (Fig. 7).

Selector-repeater 700 (Fig. 7) is seized by fourth selector 120 upon finding resistance battery on control conductor C703 via contacts 729 and 782. Thereafter, fourth selector 120 will extend the loop circuit over negative conductor C701 and positive conductor C702 in a well-known manner. The extension of the loop circuit will operate relay 715. At contacts 716, relay 715 prepares a loop circuit to the succeeding switch. At contacts 717 an obvious circuit is closed to relay 720. Relay 720 operates and at contacts 721 prepares a circuit to relay 740. At contacts 723, circuits are prepared to relays 750, 770, and rotary magnet 785. At contacts 724 a circuit is prepared to relay 765. At contacts 726 a circuit is prepared to relay 735. At contacts 728 ground is returned over C conductor C703 to hold the preceding equipment in a well-known manner.

Assuming the next digit dialled by subscriber T1 is the digit "9," relay 715 will intermittently restore and operate nine times responsive to the nine digital impulses. Upon the first restoration of relay 715, contacts 717 opens the circuit to relay 720 however, relay 720 is of the slow-to-release type and remains operated. At contacts 718 circuits are closed to relays 730, 735, and vertical magnet 781; the first circuit extending from ground, contacts 718, 725, 795 of cam 3, winding of relay 730 to battery; the second circuit including contacts 736, winding of relay 735 to battery; and the third circuit including contacts 794 of cam 2, winding of vertical magnet 781 to battery. The operation of relay 730 at contacts 731 and the operation of relay 735 at contacts 737 closes an obvious locking circuit to relay 735. At contacts 733 an obvious circuit is closed to energize motor magnet 790 of sequence switch 789.

Upon the first reoperation of relay 715, contacts 718 opens the circuits to relays 730, 735 and vertical magnet 781. However, relay 730 being slow-to-release remains operated throughout the impulse series, and relay 735 remains operated over the mentioned locking circuit. Vertical magnet 781 restores and vertically steps wipers 796, 797, 798 and 799 one step to operate the VON springs. At VON contacts 782 and the opening of contacts 729, resistance battery is removed from C conductor C703. At VON contacts 783 a circuit is prepared to release magnet 780. The energization of motor magnet 790 opens its interrupter contacts 791 however, the wipers 747, 748 and 749 of the sequence 789 are not affected because they are stepped only upon deenergization of the motor magnet 790. Vertical magnet 781 will thus pulse nine times and step the wipers 796, 797, 798, and 799 to the ninth level of bank contacts.

At the end of the series of impulses, relay 715 remains fully operated opening contacts 718 to restore relay 730, and deenergize vertical magnet 781. The restoration of relay 730 at contacts 731 opens the locking circuit to relay 735, causing restoration thereof. At contacts 733 the circuit is opened to deenergize motor magnet 790. The deenergization of motor magnet 790 steps wipers 747, 748 and 749 one step from their normal position to position 1 whereby; wiper 747 will remain disengaged from cam 1; wiper 748 will disengage cam 2; and wiper 749 will remain engaged with cam 3. The disengagement between wiper 748 and cam 2 causes actuation of the springs associated therewith whereby; contacts 793 opens a prepared circuit to release magnet 780; contacts 793′ prepares a circuit to motor magnet 790; contacts 794 closes a circuit to rotary magnet 785; contacts 794′ further opens the circuit to vertical magnet 781. The rotary circuit extending via battery, winding of rotary magnet 785, contacts 786, 794, 788, 775, 767, 723 to ground. By means of its interrupter contacts 786, rotary magnet 785 will rotate the wipers 796, 797, 798 and 799 one step for each interruption over the ninth level of bank contacts in search of an idle finder-selector link. The idle condition existing when battery is found by control wiper 799.

Assuming first that no idle finder-selector link is found during rotation of the wipers, the wipers will rotate to the off-normal or eleventh rotary position and operate the cam springs. At cam contacts 787, busy tone would be closed to the preceding loop circuit; the busy tone extending via conductor C704, condenser, cam contacts 787, condenser 709, contacts 713, positive conductor C702, to the calling party notifying him of the busy condition. At cam contacts 788, the rotary circuit is opened causing restoration of rotary magnet 785. The calling party will thus hang up and restore the equipment in a manner to be described in the ensuing description.

Assuming that finder-selector link 900 (Fig. 9) is seized by selector-repeater 700 upon wiper 799 finding battery on C conductor C904 extending from winding of relay 920, contacts 945 and 911. Over this circuit relay 920 will operate and at contacts 922 and 924 closes the loop circuit from selector-repeater 700 to finder-connector 1000 (Fig. 10) in Apartment House Suboffice Exchange 3 (Fig. 1B). At contacts 926, a circuit is prepared to relay 910. At contacts 927, relay 920 locks operated to the grounded control conductor C904. The extension of the loop circuit from selector 700 to finder-connector 1000 operates relay 1030; the circuit extending from battery, upper winding of relay 1030, contacts 1061, 1023, 1016, conductor C1001, contacts 941 (Fig. 9), 922, negative conductor C901, seized bank contact, wiper 796 (Fig. 7), contacts 771, 762, 716, 721, winding of relay 740, contacts 763, 772, wiper 797, seized bank contact, positive conductor C902 (Fig. 9), contacts 924, 943, positive conductor C1002 (Fig. 10), contacts 1017, 1024, 1063, lower winding of relay 1030 to ground. Over the last mentioned circuit relay 740 will not operate due to the shunt placed on the windings at contacts 792 of sequence switch 789. The operation of relay 1030 at contacts 1031 closes an obvious circuit to operate relay 1035. The operation of relay 1035 at contacts 1036, completes an obvious circuit to operate relay 1040. At contacts 1037, a locking circuit is prepared to relay 1035. At contacts 1038′ and the operation of relay 1040 at contacts 1041, prepares a circuit to vertical magnet 1010. Thus, at this point selector-repeater 700 will receive the next series of digital impulses, where they will be forwarded through finder-selector link 900 into finder-connector 1000.

Assuming the next digit dialled is the digit "2," relay 715 will subsequently release and operate two times responsive to the receipt of the two digital impulses. Upon the first release of relay 715, at contacts 716 the loop circuit to relay 1030 is opened. At contacts 718 the circuit to relay 730 is again closed. However, the circuit to vertical magnet 781 is now opened at contacts 794′ and will not respond. Relay 735 will operate and lock as previously described, and motor magnet 790 will again energize from ground at contacts 733. Relays 720, 730 and 735 will remain operated throughout the impulse series as previously disclosed. At the end of the impulse series, relays 730 and 735 will restore. Contacts 733 open to deenergize motor magnet 790 to step wipers 747, 748, and 749 of sequence switch 789 one step to position 2. At position 2, the sequence switch wipers will not affect the contacts associated therewith, and thus no further explanation is considered necessary.

The two openings of the loop circuit to relay 1030 will subsequently restore and operate the relay two times. Upon the first restoration of relay 1030 a circuit is closed to vertical magnet 1010 via ground, contacts 1032, 1038′, 1041, 1028, winding of vertical magnet 1010 to battery. Relays 1035 and 1040 being of the slow-to-release type, remains operated throughout the impulse series. Thus, upon receipt of the two digital impulses, vertical magnet 1010 will step wipers 1096, 1097, 1098, 1099 and vertical wiper 1091 to the second bank level. The energization of vertical magnet 1010 closes its interrupter contacts 1011, however without affect on an incoming call. Upon the wipers taking the first vertical step, the VON springs will operate whereby; at VON contacts 1012 the operating circuit to relay 1040 is opened to cause restoration thereof at the end of the digital impulse series; at VON contacts 1012′ a circuit is prepared to relay 1060; at VON contacts 1013 a circuit is prepared to release magnet 1055; at VON contacts 1014 a second ground is closed to guard lead C1078 and the contact on the bank of allotter 300 to busy finder-connector 1000 to outgoing calls from suboffice exchange 3. Selector-repeater 700 and finder-connector 1000 are now ready to receive the next series of digital impulses.

Assuming the next digit dialled by the calling subscriber is the digit "3," relay 715 will subsequently restore and operate three times. Relays 730 and 735 will reoperate as previously described and motor magnet 790 will energize. Also, the loop circuit to relay 1030 will be opened three times to pulse this relay. At the end of the digital impulse series relays 730 and 735 and motor magnet 790 will restore. The restoration of motor magnet 790 will now step wipers 747, 748, and 749 to position 3 causing; wiper 747 to engage cam 1; wiper 748 to remain disengaged with cam 2; wiper 749 to disengage cam 3. The engagement of wiper 747 with cam 1 causes the springs associated therewith to actuate whereby; contacts 792 opens the shunt across busy-test relay 740; contacts 792′ prepares a circuit to switch through relay 760. The disengagement between wiper 749 and cam 3 opens the prepared circuit to relay 730 at contacts 795. It will be pointed out here that the sequence switch wipers advances to position 3 before relay 735 restored. This will allow relay 740 time to operate before relay 735 restored if the called line is found busy. If the line is not busy, battery will be removed from the trunk before relay 740 can operate. This will be explained further in the ensuing description.

Upon receipt of the three impulses from selector-repeater 700 relay 1030 will again restore and operate three times. For each restoration of relay 1030 at contacts 1032 a circuit is closed to intermittently energize rotary magnet 1007; the circuit extending from ground, contacts 1032, 1038', 1042, 1048, 1067, 1027, winding of rotary magnet 1007 to battery. Over this last mentioned circuit relay 1050 also operates, and due to its slow-to-release characteristics remains operated throughout the impulse series. The operation of relay 1050 at contacts 1052 prepares a circuit to relay 1045, and at contacts 1054 an obvious alternate circuit is closed to relay 1050 and rotary magnet 1007. For each pulse received by rotary magnet 1007, the wipers 1096, 1097, 1098, and 1099 will rotate one step over the second level. The alternate circuit for relay 1050 and rotary magnet 1007 is provided in the event that during rotation of the wipers, control wiper 1097 engages a ground (designating a busy line) relay 1045 would operate and open the original pulsing circuit to rotary magnet 1007 at contacts 1048. This ground is traced from wiper 1097, contacts 1022, 1052 to winding of relay 1045 to battery. However, with the provided alternate path, rotary magnet 1007 would rotate the wipers to the contact corresponding to the dialled digit and bypass this busy contact. The wipers 1096, 1097, 1098, and 1099 will thus be stepped rotary to the third bank contact on level two.

It should be pointed out that selector-repeater 700 and finder-connector 1000 operated almost simultaneously and therefore the operations to be explained happen nearly simultaneously with respect to these switches.

It will first be assumed that the called line T2 is found busy. Ground will thus be contacted by wiper 1097 to operate relay 1045 over the previously mentioned circuit. Since relay 1050 is slow-to-release when its circuit was opened by the full operation of relay 1030, the circuit to relay 1045 is closed through contacts 1052. After a short interval of time relay 1050 restores opening contacts 1052 and the circuit to relay 1045 however, contacts 1053 closes before contacts 1052 open, to provide a locking circuit for relay 1045; the last mentioned circuit extending from ground, contacts 1036, 1012', 1047, and 1053. The operation of relay 1045 at contacts 1046 opens to prevent the operation of relay 1060 and prevents the extension of the loop circuit to the called line. Meanwhile, since the called party was found busy, busy-test relay 740 in selector-repeater 700 operates in series with relay 1030 over the mentioned loop thereto since at contacts 792 the shunt has been removed from relay 740. At contacts 741 relay 740 closes busy tone back to the calling subscriber; the busy tone being sent via conductor C704, condenser, contacts 741, condenser 709, contacts 713, conductor 702 and back over the positive side of the loop to the calling party T1. At contacts 742 a shunt is placed across the loop extending to finder-connector 1000 so that no more pulses can be sent thereto. At contacts 743 the prepared circuit to relay 760 is opened. Upon receipt of the busy tone subscriber T1 will hang up the receiver to release the equipment in a manner to be described in the ensuing description.

Assuming that subscriber T2 was not found busy upon the wipers engaging the contacts extending thereto, battery would be found and extended by control wiper 1097 to relay 1060; the circuit extending via battery, wiper 1097, contacts 1022, 1051, upper winding of relay 1060, contacts 1046, 1012', 1036 to ground. The circuit traced through the upper winding of relay 1060 being sufficient to only operate its "X" contacts 1069 which closes an obvious circuit through its lower winding to operate relay 1060 fully. At contacts 1062 and 1064 relay 1060 extends the loop circuit from selector-repeater 700 through the line circuit and to the called subscriber T2's line. At contacts 1061 and 1063 the circuit to relay 1030 is opened. At contacts 1065 a ground is provided to hold the succeeding line switch over the control wiper 1097. At contacts 1067 the circuits to relay 1050 and rotary magnet 1007 are further opened. At contacts 1068 the prepared circuit to release magnet 1055 is further opened. At contacts 1066 a locking circuit is provided for relay 1035; the circuit extending from battery, winding of relay 1035, contacts 1066, 1037, 1018, to ground. Relay 1030 restores and at contacts 1031 opens the operating circuit to relay 1035 however, relay 1035 remains operated over the mentioned locking circuit. Due to the opening of the loop circuit extending to relay 1030, busy-test relay 740 in selector-repeater 700 will not operate. Instead, switch-through relay 760 will operate over a circuit extending from battery, winding of relay 760, contacts 776, 792', 743, 738, 732, 726 to ground. At contacts 762' ringing generator will be transmitted to the called party; the circuit extending from conductor C706, lower winding of relay 750, contacts 751, 762', 771, wiper 796, negative conductor C901 of finder-selector link 900, contacts 922, 941, negative conductor C1001 of finder-connector 1000, contacts 1016, 1023, 1062, wiper 1098, line circuit 105 and through the ringer (not shown) of subscriber T2. At contacts 761 ringback tone is transmitted back to the calling subscriber T1; the circuit extending from conductor C769, condenser, contacts 761, 753, condenser 708, contacts 711, over the negative side of the line of the preceding equipment to subscriber T1. At contact 762' and 763' a circuit to relay 710 is prepared and also prepares the extension of the loop circuit from the preceding equipment to subscriber T2. At contacts 764 a ground is extended via wiper 798, EC conductor C903, contacts 926, winding of relay 910 to battery, to operate relay 910 in finder-selector link 900. At contacts 911 relay 910 opens the operating circuit to relay 920 however, relay 920 remains operated over the mentioned locking circuit. At contacts 912 an obvious circuit is closed to operate relay 930. At contacts 931, relay 930 prepares a circuit to relay 940.

Assuming the called party T2 responds to the ringing, the removal of the handset opens the ringer circuit and closes a loop circuit to partially operate relay 750 in selector-repeater 700; the circuit extending from battery superimposed on conductor C706, lower winding of relay 750, contacts 751, 762, 771, wiper 796, negative conductor C901, contacts 922, 941, conductor C1001, contacts 1016, 1023, 1062, wiper 1098, line circuit 105, through the handset of subscriber T2, line circuit 105, wiper 1098, contacts 1064, 1024, 1017, positive conductor C1002, contacts 943, 924, positive conductor C902, wiper 797, contacts 772, 763', 754 to ground. Over this circuit relay 750 will only operate its "X" contacts 756 to complete an obvious circuit through its upper windings. Over this last circuit relay 750 operates fully and at contacts 753 ringback tone is opened to the calling party. At contacts 752 and 754 the loop circuit from the called party's handset is closed to operate relay 710, and completes the loop circuit from the calling party T1 to the called party T2. At contacts 711 and 713 the circuit to relay 715 is opened, however, at contacts 712 and 714 relay 715 is maintained operated with the exception that the polarity has been reversed. It will be pointed out also that transmission battery is provided for subscriber T1 from relay 715, and transmission battery is provided for subscriber T2 from relay 710. Conversation can now take place.

It will thus be seen that the called party in a sub-office receives ringing current from the selector-repeater in the main exchange (Fig. 1C), and the calling party in a suboffice receives ringback tone from the main exchange. The calling and called parties in distant suboffices also get transmission battery from the main exchange. Also, busy tone is supplied from the main exchange even though the busy line is in the suboffice.

*Release*

At the termination of the call between subscribers T1 and T2, the conversing parties will hang up their handsets to release the equipment. Assuming subscriber T2 hangs up first, the loop circuit therefrom will be opened to relay 710 causing restoration thereof. At contacts 712 and 714 the alternate circuit to relay 715 is opened however, at contacts 711 and 713 the preceding loop is closed to maintain relay 715 operated until the calling party hangs up. Thus, the only restoration taking place when the called party hangs up is relay 715 in selector-repeater 700. Thus, the equipment is released under the control of the calling party.

When subscriber T1 hangs up at the calling end, the loop circuit is opened through finder 200 (Fig. 2), finder-selector link 400 (Fig. 4), selector 500 (Fig. 5), 110, 115, 120, and selector-repeater (Fig. 7). Relay 715 (Fig. 7) restores upon opening the loop, to thus open contacts 717 leading to relay 720. At contacts 716, a prepared circuit to relay 740 is opened. After a short interval of time slow-to-release relay 720 restores. At contacts 721 the prepared circuit to relay 740 is further opened. At contacts 723 the multiple circuits are opened to relays 750, 770 and 920 in finder-selector link 900, causing restoration thereof. At contacts 724 a prepared circuit to relay 765 is opened. At contacts 726 the circuit to relay 760 is opened causing restoration thereof. At contacts 727, a circuit is closed to motor magnet 790; the circuit extending from ground, contacts 727, 793', 791, winding of motor magnet 790 to battery. At contacts 728, ground is removed from C conductor C703 causing the release of selectors 120, 115, and 110 in a well-known manner. The restorations of relays 750, 760 and 770 further open the loop circuit to finder-selector link 900. At contacts 764 the circuit to relay 910 in finder-selector 900 (Fig. 9) is opened causing restoration thereof. Motor magnet 790 energizes to open contacts 791 and breaks the circuit thereto. Motor magnet 790 will thus deenergize, causing wipers 747, 748, and 749 to step to their normal position whereby; wiper 747 disengages cam 1; wiper 748 engages cam 2; wiper 749 engages cam 3. The sequence switch wipers thus cause their respective springs to resume their normal positions whereby at contacts 793' the circuit to motor magnet 790 is opened to prevent any further energizations thereof. At contacts 793 a circuit is closed to release magnet 780; the circuit extending from battery, winding of release magnet 780, contacts 783, 793, 727 to ground. Release magnet 780 operates to restore wipers 796, 797, 798, and 799 to normal and restore the vertical off-normal springs. At VON contacts 783 the circuit to release magnet 780 is opened causing deenergization thereof. At VON contacts 782 resistance battery is placed on control conductor C703 to make selector-repeater 700 again available for seizure by an incoming selector.

The restoration of relay 920 in finder-selector link 900 further opens the loop circuit to finder-connector 1000 at contacts 922 and 924. The restoration of relay 910 at contacts 911 places battery from the winding of relay 920 on control conductor C904 to avail finder-selector link 900 for seizure by an incoming selector. At contacts 912 the circuit to relay 930 is opened however, relay 930 is slow-to-release and remains operated long enough to complete an obvious circuit via its contacts 931 and contacts 913 of relay 910 to operate relay 940. At contacts 942 and 944, 110 volt battery is transmitted over negative and positive conductors C1001 and C1002 respectively from conductor C955. At contacts 945 the battery availing selector-repeater 900 for seizure is opened to prevent seizure thereof only until relay 940 restores. Relay 940 being slow-to-release remains operated for a short duration after relay 930 restores. It will also be pointed out that supervisory lamp L950 operates for supervisory purposes from the 110 volt surge from ground through the windings of relay 1005 in finder-connector 1000. After a short duration relay 940 will restore to remove the 110 volt source and reclose battery to control conductor C904 to avail finder-selector link 900 for seizure.

Upon receipt of the temporary 110 volts battery over positive conductor C1002, lamp L1003 and relay 1005 will operate over an obvious circuit. Lamp L1003 being for supervisory purposes. At contacts 1006 relay 1005 closes an obvious circuit to relay 1015. Relay 1015 operates opening contacts 1016 and 1017 to prevent seizure of finder-connector 1000 until a complete release takes place. At contacts 1018 the circuits to relays 1035 and 1060 are opened causing restoration thereof. At contacts 1019 another multiple ground is placed on guard conductor C1078 to busy finder-connector 1000 to an incoming allotter. The restoration of relay 1060 at contacts 1065 opens ground to control wiper 1097 to restore line circuit 105. Relay 1035 being slow-to-release restores after a short duration, and at contacts 1038' opens the locking circuit to relay 1040 which restores after a short duration due to its slow-to-release characteristics. At contacts 1038 a circuit is closed to release magnet 1055; the circuit extending from ground, contacts 1032, 1038, 1026, 1068, 1013, winding of release magnet 1055 to battery. At contacts 1039 one of the multiple grounds to guard conductor C1078 is removed. Release magnet 1055 operates and restores wipers 1096, 1097, 1098, and 1099, to normal to thus restore the VON springs. At VON contacts 1013 the circuit to release magnet 1055 is opened causing restoration thereof. At VON contacts 1014 another multiple ground is removed from guard conductor C1078. Upon the termination of the temporary 100 volt battery surge, lamp L1003 extinguishes and relay 1005 restores. At contacts 1006 relay 1005 opens the circuit to relay 1015 causing restoration thereof. At contacts 1016 and 1017 relay 1015 avails finder-connector 100 for seizure by an incoming finder-selector link. At contacts 1019 the last multiple ground is removed to guard conductor C1078 to avail finder-connector 1000 for seizure by an allotter.

The restoration of the second selector 110 will remove ground from C wiper 599 to restore relay 530 (Fig. 5) and relay 420 (Fig. 4). The restoration of relay 530 at contacts 535 and 536 opens the locking circuits to relays 420 and 530. At contacts 537, a circuit is closed to release magnet 580 over a circuit including contacts 542, 554 and 574. Release magnet 580 energizes to restore wipers 597, 598 and 599 to normal, whereby VON contacts 574 opens to deenergize the release magnet. First selector 500 is again available for seizure.

The restoration of relay 420 in finder-selector link 400 (Fig. 4) closes an obvious circuit via contacts 421 to relay 450. At contacts 422 the circuit to relay 400 is opened however, relay 440 is slow-to-release and remains operated long enough to maintain the circuit closed to relay 440 via contacts 441. At contacts 423 a circuit to relay 430 is prepared from incoming selectors. Relay 450 operates and at contacts 451 and 453 the loop circuit from finder 200 is opened to selector 500. At contacts 452 and 454 a 110 volt battery surge is transmitted over conductors C291 and C292 to finder 200. Over this last circuit, lamp L445 will operate for supervisory purposes. At contacts 455 battery is maintained opened from control conductor C407. After a short duration slow-to-release relay 440 restores. The restoration of relay 440 at contacts 441 opens the circuit to relay 450 however, relay 450 is slow-to-release and remains operated for a short duration. Relay 450 will remain operated for a sufficient time to maintain the 110 volt surge extending to finder 200 for restoration purposes to be described. After a short interval relay 450 restores to remove the 110 volt source and at contacts 451 and 453 avail first selector 500 for seizure. At contacts 455 battery from relay 430 is placed on control conductor C407 to avail finder-selector link 400 for seizure to an incoming selector.

Upon receipt of the 110 volt source from finder-selector link 400, relay 250 in finder 200 will operate and lamp L255 will ignite in series via conductor C291. The operation of relay 250 at contacts 251 closes an obvious circuit to relay 240. At contacts 252 a multiple ground is closed to relay 260. Relay 240 being slow-to-release will not operate until after relay 250 has closed the multiple ground to relay 260, because when relay 240 operates the circuit to relay 260 is opened at contacts 243. Upon the operation of relay 240, at contacts 241 the locking circuit to relay 220 is opened. At contacts 242 ground is placed on guard leads C803 and C207 to maintain finder 200 busy to the allotters and connector 800' busy to incoming calls. Relay 220 restores, and at contacts 221, 222 and 224 the circuit to the line circuit 100 is opened causing restoration thereof. At contacts 223 a circuit is closed to release magnet 210 via contacts 232 and 283. Release magnet 210 energizes to restore wipers 201, 202, 203 and 215 to normal whereby; VON contacts 283 opens to deenergize release magnet 210; VON contacts 284 opens to remove one of the multiple grounds to guard conductor C207.

Upon the termination of the 110 volt battery surge, relay 250 restores and lamp L255 extinguishes. At contacts 252 the circuit to relay 260 is opened causing immediate restoration thereof. At contacts 251 the circuit to relay 240 is opened however, relay 240 is slightly slow-to-release so as not to prevent the restoration of relay 260. This permits relay 260 to restore and open its locking circuit via contacts 267 before relay 240 recloses the locking circuit by re-closing contacts 243. At contacts 262 and 264 the loop circuit to first selector 500 is further opened. At contacts 266 the last multiple ground to guard conductors C803 and C207 are opened to avail connector 800' and finder 200 for seizure.

*Call from subscriber T1 to T3*

Assuming that a subscriber in apartment house suboffice 1, such as T1, wishes to call another subscriber in apartment house suboffice 2, such as T3. When subscriber T1 lifts the handset, the closure of the line loop circuit will operate the line circuit 100. It will further be assumed that finder 200, finder-selector link 400, and first selector 500 are seized in a manner previously disclosed. It will be still further assumed that second selector 110, third selector 115, and selector-repeater 600 (Fig. 6), are seized in a conventional manner upon the calling subscriber dialling the first three digits. Selector-repeater 600 being seized on the eighth level of third selector 115, upon the third dialled digit being the digit "8."

Selector-repeater 600 (Fig. 6) is found idle by the control wiper (not shown) of third selector 115 finding resistance battery on control conductor C603 extending via contacts 638 and 616. Also, the loop circuit will be extended via negative conductor C601 and positive conductor C602 to operate relay 610. The operation of relay 610 at contacts 611 prepares a loop circuit to the succeeding switch to be seized. At contacts 612 an obvious circuit is closed to relay 630. Relay 630 operates whereby at contacts 631 a circuit is prepared to relay 650. At contacts 632 a circuit is prepared to relay 680. At contacts 633 ground is placed on control wiper 699. At contacts 634 a circuit is prepared to vertical magnet 615 and relays 640 and 645. At contacts 638 resistance battery is removed from control conductor C603 and at contacts 637 replaced by ground to hold the preceding equipment in a well-known manner.

Assuming that the next digit dialled by subscriber T1 is the digit "8," relay 610 will intermittently restore and operate eight times. Upon receipt of the first pulse of the digital series, a circuit is closed to vertical magnet 615 and relays 640 and 645; the first circuit extending from ground, contacts 613, 634, wipers 677 and 678 of sequence switch 673, winding of vertical magnet 615 to battery; the second circuit extending via the ground, wiper 677, winding of relay 640 to battery; and the third circuit via contacts 648, winding of relay 645 to battery. Relays 630 and 640 being slow-to-release remain operated throughout the impulse series during the intermittent opening of contacts 612 and 613. The operation of relay 640 at contacts 641 and the operation of relay 645 at contacts 647 provides a locking circuit to relay 645 via ground at contacts 635. At contacts 643 an obvious circuit is closed to energize motor magnet 625, however the sequence switch wipers will step only upon deenergization of motor magnet 625. At contacts 648 the operating circuit to relay 645 is opened however, relay 645 remains operated over the mentioned locking circuit. For each ground pulse received by vertical magnet 615 the wipers 696, 697, 698 and 699 will take one step. Upon these wipers taking their first step, the vertical off-normal springs will operate whereby; VON contacts 616 opens to further remove the resistance battery from control conductor C603; at VON contacts 617 a circuit is prepared to the release magnet 619.

At the end of the series of digital impulses the wipers 696, 697, 698, and 699 will rest on the eighth level of bank contacts, and relay 640 will restore after a short duration, to in turn restore relay 645. Contacts 643 open to deenergize motor magnet 625, to in turn, step the sequence switch wipers 674, 675, 676, 677, 678, and 679 one step to their respective first bank contacts. The stepping of the sequence switch wipers one step closes a circuit to rotary magnet 620; the circuit extending from battery, winding of rotary magnet 620, contacts 621, wiper 679, the first contact on level 6 of sequence switch 673, contacts 623, 685, 672, 632 to ground. Also, when the sequence switch wipers take their first step, the sequence off-normal spring operates whereby, at contacts 639 a homing circuit to motor magnet 625 is prepared. By means of its self-interrupter contacts 621, rotary magnet 620 will rotate the wipers 696—699 over the eighth level in search of an idle selector-repeater.

It will be assumed that a finder-selector link, such as 400' (Fig. 4), is found idle upon wiper 699 finding battery on the bank contact connected to the control conductor of finder-selector link 400'. Finder-selector link 400' as mentioned is seized upon finding battery on C conductor C407 via contacts 423, 455, and the winding of relay 430. Over this last circuit relay 670 and relay 430 in finder-selector link 400' operate in series. The operation of relay 670 at contacts 671 closes an obvious circuit to relay 680. At contacts 672 the circuit to rotary magnet 620 is opened to stop rotation of the wipers. Relay 680 operates and at contacts 684 locks operated via contacts 632. At contacts 683, relay 670 is shunted to cause restoration thereof. At contacts 685 the rotary circuit is maintained open. At contacts 686 a circuit is prepared to relay 660. At contacts 681 and 682, and the operation of relay 430 at contacts 431 and 434, closes a loop circuit to a connector, such as connector 800 (Fig. 8); the circuit extending via battery, lower winding of relay 810 (Fig. 8), contacts 851, contacts 261 (Fig. 2) in the assumed associated finder 200', conductor C292, contacts 453 (Fig. 4), 434, positive conductor C405, wiper 697 (Fig. 6), contacts 682, 663, winding of busy-test relay 650, contacts 631, 611, 661, 681, wiper 696, negative conductor C404 (Fig. 4), contacts 432, 451, conductor C291, contacts 263 (Fig. 2), conductor C802 (Fig. 8), contacts 853, upper winding of relay 810 to ground. Busy-test relay 650 will not operate over the mentioned loop circuit due to a shunt provided thereon by wiper 675 of sequence switch 673 engaging the first contact on level 2. Relay 810 will operate over the mentioned loop however, wiper 677 of sequence switch 673 places a shunt across contacts 611 to prevent relay 810 from pulsing on receipt of the next dialled digit. This last shunt is provided so as to busy the trunk at the sub-office to calls from that end, but the connector 800 is not as yet ready to receive the next dialled digit.

Before continuing with the completion of the call, had no idle finder-selector link been found by the wipers of selector-repeater 600, rotary magnet 620 would rotate the wipers 696—699 to the eleventh or overflow position to operate the cam springs. At cam contacts 622, busy tone would be sent back to the calling party via conductor C604, condenser, cam contacts 622, condenser 614, contacts 606, and back over the negative side of the line to notify the calling party of the busy condition. At cam contacts 623 the rotary circuit is opened to deenergize rotary magnet 620. The calling party would then hang up and restore the equipment in a manner to be disclosed in the ensuing description.

The next digit dialled will be a digit for choosing one of ten frequencies to be used. Although, the minor switch 690 is shown wired to accommodate only three frequencies it can be assumed that more exist. The different frequencies will correspond to different ringers on a ten party line, and this digit dialled will correspond to the predetermined party wanted.

Assuming that the next digit dialled is the digit "2," relay 610 will intermittently restore and operate two times. Upon each release of relay 610, a circuit is closed to pulse minor switch stepping magnet 689; the circuit extending from ground, contacts 613, 634, first contact on level 4 of sequence switch 673, wipers 677, 678, first contact on level 5 of sequence switch 673, winding of stepping magnet 689 to battery. Relays 640 and 645 will operate as before, and at contacts 643 the circuit to motor magnet 625 is closed to cause energization thereof. Upon receipt of the two ground pulses, stepping magnet 689 will step the wiper 691 to the second contact designated F2, of minor switch 690. When wiper 691 took the first step, the minor switch off-normal spring operated, whereby at MSON contacts 628 a circuit is prepared to the minor switch release magnet 624. At the end of the dialled impulses relays 640, 645 and stepping magnet 689 restores. Thus, at contacts 643 the circuit to motor magnet 625 is opened. Motor magnet 625 deenergizes and steps the sequence switch wipers 674—679 to their respective second bank contacts. The stepping of the sequence switch wipers to their second bank contacts will open the shunt across contacts 611 of pulsing relay 610 to permit the seized connector 800 to respond to the remaining two digits to be dialled.

As mentioned, finder-selector link 400' (Fig. 4) was seized by selector-repeater 600 and relay 430 operated whereby, at contacts 437 relay 430 locks operated. At contacts 435 a circuit is prepared to relay 420. At contacts 431, 433 and 436, prepared circuits to a first selector, such as 125 are opened. Also, connector 800 (Fig. 8) was seized and relay 810 operated whereby, at contacts 811 an obvious circuit is closed to relay 815. Relay 815 operates and at contacts 816 completes an obvious circuit to the upper winding of relay 820. At contacts 819 a ground is placed on guard lead C803 to busy the associated finder to make it inactive. At contacts 817 and the operation of relay 820 at contacts 821 prepares a circuit to the lower winding of relay 820 and the vertical magnet 825. Connector 800 is now ready to receive digital impulses.

Upon receipt of the next series of digital impulses, assuming the digit "5," relay 610 in selector-repeater 600 will restore and operate five times as before. Relays 630, 640, and 645 will also operate and lock in a manner previously disclosed. Also, motor magnet 825 will again be energized. At contacts 611 a loop circuit to pulsing relay 810 is intermittently closed responsive to the impulse series received by relay 610; the circuit extending from battery, lower winding of relay 810, contacts 851, negative conductor C809, contacts 261 (Fig. 2), conductor C292 (Fig. 4), contacts 453, 434, positive conductor C405, bank contact, wiper 697 (Fig. 6), contacts 682, 663, winding of relay 650, contacts 631, 611, 661, 681, wiper 696, bank contact, negative conductor C404 (Fig. 4), contacts 432, 451, conductor C291 (Fig. 2), contacts 263, positive conductor C802, contacts 853, upper winding of relay 810 to ground. Relay 810 will thus intermittently restore and operate five times. Relays 815 and 820 are slow-to-release and will remain operated throughout the impulse series. Upon the intermittent restorations of relay 810, at contacts 811 a circuit is closed to the lower winding of relay 820 and the winding of vertical magnet 825. Vertical magnet 825 will thus step the wipers 897, 898, and 899 one step for each pulse received. Upon the wipers taking the first step, the vertical off-normal springs operate whereby; at VON contacts 826 the operating circuit to relay 820 is opened however, relay 820 remains operated through its lower winding during the impulse series; at VON contacts 816 ground is placed on control wiper 899 via the upper windings of relay 850; at VON contacts 828 a circuit to release magnet 860 is prepared. At the end of the digital impulse series wipers 897, 898, 899 will be on the fifth level of bank contacts, and relay 820 will restore to prepare a circuit to rotary magnet 840.

Meanwhile, in selector-repeater 600 at the end of the digital impulse series, relays 640 and 645 will again restore to again deenergize motor magnet 625 and step the sequence switch wipers to their respective third contact. The stepping of the sequence switch wipers to their third bank contacts will have no further effect on selector-repeater 600, and will therefore not be further described.

Assuming the last digit dialled to extend the call to subscriber T3 is the digit "2," relay 610 will again restore and operate two times. Relays 640 and 645 will again operate and lock, to in turn energize motor magnet 625. At contacts 611, the loop circuit to relay 810 is again intermittently closed and opened to pulse relay 810. Relay 810 will thus restore and operate two times, whereby at contacts 812 a circuit is closed to relay 835 and rotary magnet 840; the circuits including ground, contacts 812, 817, 822, 833 and 856. Relay 835 operates and at contacts 836 opens the prepared circuit to relay 850. At contacts 838 relay 830 is connected to control wiper 899. At contacts 837 a prepared locking circuit to relay 830 is opened for reason to subsequently follow. Upon receipt of the ground pulses, rotary magnet 840 will rotate wipers 897—899 over the fifth level to the second bank contact. Had the first bank contact been busy when the wipers passed thereover ground would have been encountered by control wiper 899 and relay 830 would have operated momentarily however, as mentioned contacts 837 and the locking circuit thereto is opened. Also, the momentary opening of contacts 833 would be off set by the closing of contacts 839 to maintain the pulsing circuit to rotary magnet 840. Thus, a busy bank contact encountered by the rotating wipers will not affect the pulsing of the rotary magnet. At the end of the digital impulse series, the wipers 897—899 will engage the second contact on the fifth level of bank contacts. Rotary magnet 840 will deenergize.

Assuming first that subscriber T3 is found busy, ground is engaged on the bank contact by wiper 899, relay 830 will operate over a circuit including contacts 838. Relay 835 being slow-to-release will not restore until relay 830 operates, therefore, when relay 835 does restore its make-before-break contacts 837 and 838 operate whereby, at contacts 837 and the closing of contacts 832 complete a locking circuit to relay 830 via contacts 827 and 816. At contacts 831 the prepared circuit to relay 850 is opened. At contacts 833 and 839 the prepared circuits to relay 835 and rotary magnet 840 are opened to prevent any false operations thereof. Meanwhile, in selector-repeater 600 at the end of the digital impulse series relays 640 and 645 restore to in turn, deenergize motor magnet 625. The deenergization of motor magnet 625 will step the sequence switch wipers 674—679 to their respective fourth or last bank contacts whereby; wiper 674 prepares a circuit to relay 660; wiper 675 removes the shunt across busy-test relay 650; wiper 676 places a shunt across the loop circuit to prevent any false operations in connector 800 should any further dialling be inadvertently attempted. The remaining sequence switch wipers having no further effect on the operations taking place. Due to the busy condition encountered, and the removal of the shunt across busy-test relay 650, relay 650 will operate over the previously mentioned path. Relay 650 operating closes contacts 651 to send busy tone back to the calling subscriber T1 via conductor C604, condenser, contacts 651, condenser 614, contacts 609, and over the positive side of the preceding loop. The calling subscriber upon receipt of the busy tone will hang up and restore the equipment in a manner to be described in the ensuing description.

Should the called party T3 be found idle upon the wipers 897—898 engaging the bank contacts, battery will be encountered by control wiper 899, and when relay 835 restores after a short interval relay 850 will partially energize via contacts 836, 831, 827 and 816. The partial energization of relay 850 will be sufficient to close its "X" contacts 859 whereby a circuit will be closed to energize relay 850 completely; the circuit extending from a ground on the E conductor C804 via the associated finder, such as finder 200' (Fig. 2), (ground on contacts 243), "X" contacts 859, and through the lower winding of relay 850 to battery. At contacts 851 and 853, relay 850 opens the loop circuit to relay 810. At contacts 852 and 854 the loop circuit is extended to the called party's subset. At contacts 855 ground is placed on control wiper 899 to hold the succeeding line circuit. At contacts 857 a second ground is placed on guard lead C803 to maintain connector 800 busy to incoming calls. At contacts 858 the prepared circuit to release magnet 860 is further opened. Relay 810 restores, which in turn, restores relay 815 after a short interval. The restoration of relay 815 at contacts 819 opens the ground to guard lead C803 however, ground is maintained thereon from contacts 857.

Meanwhile, in selector-repeater 600 (Fig. 6) relays 640 and 645 will restore as mentioned, to in turn deenergize motor magnet 625 which will step the sequence switch wipers 674—679 to their last bank contacts. The removal of the shunt across busy-test relay 650 will be ineffectual in this case because the loop circuit has been extended through the ringers in the called party's subset and the resistance therein will prevent the operation of this relay. Thus, via sequence switch wipers 674 a circuit is closed to switch-through relay 660; the circuit extending via battery, winding of relay 660, contacts 686, last bank contact on level 1 of sequence switch 673, wiper 673, contacts 652, 649, 642, 635 to ground. At contacts 662 and 664 the ringing frequency will be transmitted to the subscriber T3; the circuit extending from conductor F2, minor switch wiper 691, winding of relay 655, contacts 656, 662, 681, wiper 696, bank contact, conductor C404 (Fig. 4), contacts 432, 452, conductor C291, contacts 263 of associated finder 200', conductor C802, contacts 854, wiper 898, bank contact, through subscriber's ringer, bank contact, wiper 897, contacts 852, conductor C801, contacts 261, conductor C292, contacts 453, 434, conductor C405, bank contact, wiper 697, contacts 682, 664, 658 to ground. Over the last mentioned circuit relay 655 will not operate due to the resistance in the called party's ringer. At contacts 665 ring back tone is transmitted to the calling subscriber T3; the circuit extending via conductor C688, condenser, contacts 665, 657', condenser, contacts 607, conductor C601 and back over the negative side of the line. At contacts 666 ground is placed on EC wiper 698 to operate relay 420 in finder-selector link 400' (Fig. 4) over an obvious circuit.

In finder-selector link 400' (Fig. 4), the operation of relay 420 at contacts 422 completes an obvious circuit to relay 440. At contacts 423, the operating circuit to relay 430 is opened however, relay 430 remains operated over the mentioned locking circuit. Relay 440 operates and at contacts 441 prepares a circuit to relay 450.

Upon the calling party answering the ringing, the lifting of the handset from the cradle will open the ringing and close the loop through the handset. This will open the ringer resistance and operate relay 655 whereby, at contacts 657 and 659 a circuit is closed to relay 605; the circuit extending via battery, upper winding of relay 605, contacts 657, 662, 681, wiper 696 through the succeeding loop, and back through wiper 697, contacts 682, 664, 659, lower winding of relay 605 to ground. At contacts 657' ringback tone is opened. At contacts 656 and 658 ringing current is opened. Relay 605 operates to close contacts 606 and 608 to reverse the polarity across the succeeding loop circuit from relay 610. Relay 605 will thus provide transmission battery to the called subscriber, and relay 610 will provide transmission battery to the calling party. The two subscribers can now converse over the loop circuit.

It should be understood that the above described call could also be accomplished between two subscribers in suboffice 1, or between two subscribers in suboffice 2. Also, it will thus be seen that the called and calling subscribers receive transmission battery from the main exchange. This applies also to busy tone, ringing current and ringback tone.

*Release*

Upon the termination of the call the subscribers T1 and T3 will hang up. When subscriber T3 hangs up, the circuit to relay 605 is opened, causing restoration thereof. This is the only restoration that will take place from the called end. Thus, the release of the equipment will be under the control of the calling subscriber.

When subscriber T1 hangs up, the loop circuit to relay 610 is opened. Relay 610 restores and at contacts 612 opens the circuit to relay 630. Relay 630 restores after a short interval and at contacts 632 and 633 opens the circuits to relays 670 and 680 and relay 430 in finder-selector link 400'. At contacts 635 the circuit to switch-through relay 660 is opened. At contacts 636 a circuit is closed to motor magnet 625 via contacts 639 and 626. At contacts 637 ground is removed from control conductor C603 to aid in restoring third selector 115. Relay 670 restores. Relays 660 and 680 restore whereby, at contacts 662, 664, 681, and 682 the loop circuit to finder-selector link 400' and connector 800 is opened. At contacts 666 ground is removed from EC wiper 699 to restore relay 420 in finder-selector link 400'.

Motor magnet 625 energizes over the mentioned circuit and opens its interrupter contacts 626 to open this circuit. Motor magnet 625 will thus deenergize and step the sequence switch wipers 674—679 to their respective normal position, which will in turn restore the sequence off-normal springs to normal whereby; at Seq. O.N. contacts 639 the circuit to motor magnet 625 is opened to prevent further energization thereof; at Seq. O.N. contacts 639 a circuit is closed to minor switch release magnet 625 via MSON contacts 628. Release magnet 624 energizes to restore minor switch wiper 691 to normal, to in turn restore the minor switch off-normal springs to normal whereby; at MSON contacts 628 the circuit to release magnet 624 is opened to cause deenergization thereof; at MSON contacts 627 a circuit is closed to release magnet 619 via VON contacts 617. Release magnet 619 energizes to restore the selector wipers 696—699 to normal, to in turn restore the VON springs to normal whereby, at VON contacts 616 resistance battery is again placed on control conductor C603 to avail selector-repeater 600 for seizure; at VON contacts 617 the circuit to release magnet 619 is opened to cause deenergization thereof.

In finder-selector link 400′, relays 420 and 430 restore, and at contacts 422 opens the circuit to relay 440 however, relay 440 is slow-to-release and remains operated long enough to close a circuit to relay 440; the circuit extending via ground, contacts 421, 441, winding of relay 450 to battery. Relay 450 operates and at contacts 451 closes 110 volt battery to conductor C291 to ignite lamp L445 and lamp L255 and relay 250 in finder 200′ (Fig. 2) associated with connector 800. After a short interval relay 440 will restore to open contacts 441 extending the circuit to relay 450. Relay 450 being slow-to-release will also restore after a short interval to remove the 110 volt battery from conductor C291. At contacts 421 and 455 battery is again placed on control conductor C407 to avail finder-selector link 400′ for seizure.

Upon receipt of the mentioned 110 volt battery surge from finder-selector link 400′, relay 250 in finder 200′ will operate momentarily whereby; at contacts 251 an obvious circuit is closed to relay 240; at contacts 252 ground is maintained on E conductor C804. Relay 240 being slow-to-operate will operate after a short duration and at contacts 243 will open one of the grounds from E conductor C804. At contacts 242 a multiple ground is placed on guard lead C803 to maintain connector 800 busy to incoming switches. At the termination of the 110 volt battery surge relay 250 will restore and supervisory lamp L255 will extinguish. At contacts 251 the circuit to relay 240 is opened however, relay 240 is also slow-to-release and will remain operated for a short duration. At contacts 252 ground is removed from E conductor C804 to restore relay 850 in connector 800. Relay 240 will restore after a short duration and re-close contacts 243 however, without effecting the restored relay 850 which opened its "X" contacts 859.

The restoration of relay 850 in connector 800 at contacts 852, 854 and 855 opens the circuit to the line circuit associated with subscriber T3 to cause the release thereof. At contacts 857 ground is removed from guard lead C803 to avail connector 800 for seizure. At contacts 858 a circuit is closed to release magnet 860; the circuit extending from battery, winding of release magnet 860, VON contacts 828, contacts 858, 818, 812 to ground. Release magnet 860 will energize to restore wipers 897, 898 and 899 to normal, which will in turn, restore the VON springs to normal whereby; at VON contacts 826 relay 820 is prepared for future operation; at VON contacts 828 the circuit to release magnet 860 is opened to cause deenergization thereof.

Third selector 15, second selector 110, first selector 500 (Fig. 5), finder-selector link 400 (Fig. 4), finder 200 (Fig. 2), and line circuit 100 will restore in a manner previously described to avail these switches for seizure.

*Outgoing calls from subscriber T2*

Assuming that a subscriber T2 at the apartment house suboffice exchange 3 (Fig. 1B), attempts to make an outgoing call, the calling party will initially remove the handset. The closure of the line loop will operate a line circuit 100, which will operate the line relay therein. The line relay will close ground over start lead C319 (Fig. 3) to allotter 300′, via the winding of relay 310 to battery. The allotter 300′ will now hunt for idle finder.

Allotter 300′ will operate in a manner previously disclosed and the detailed operations thereof will not be considered necessary, however, a few brief operations and assumptions will follow. Relay 310 will operate thru its lower winding, which in turn, operates relay 320. Relay 320 locks relay 310 operated and operates relay 330. Relay 320 grounds start lead C305, and assuming the start wiper engages the idle finder-connector 1000 (Fig. 10) relay 1070 therein will operate over ST conductor C1059. It will be assumed that line circuit 105 placed ground on the second level of vertical bank 1090.

Relay 1070 operates and at contacts 1071 prepares a resistance across the outgoing trunk. At contacts 1072 an obvious circuit is closed to relay 1020. At contacts 1074 a circuit is prepared to relay 1080. At contacts 1075 a circuit is prepared to rotary and at contacts 1076 a circuit is prepared to vertical magnet 1010. Relay 1020 operates and at contacts 1023′ and 1024′ the resistance is extended to an outgoing finder-selector link, such as 900, and a first selector. At contacts 1025 relay 1020 locks operated via contacts 1018. At contacts 1027′ the circuit to rotary magnet 1007 is further prepared. At contacts 1028′ the circuit to vertical magnet 1010 is closed; the circuit extending via contacts 1076 and the ground on conductor C302. Vertical magnet 1010 energizes and steps the wipers 1096, 1097, 1098, 1099 and vertical wiper 1091 one step. Also, contacts 1011 close ground to relay 340 in allotter 300. Relay 340 operates and opens the circuit to vertical magnet 1010. Vertical magnet 1010 deenergizes to open the circuit to relay 340. This sequence of interrupted operations continues until the marked level (second level) is found. When the marked level is reached ground on vertical wiper 1091 will operate relay 350 via contacts 1077 and conductor C304. Relay 350 operates and closes ground to conductor C303 to energize the rotary magnet 1007. When the wipers took their first vertical step, the VON springs operated whereby; at VON contacts 1013 a circuit is prepared to release magnet 1055; at VON contacts 1014 a ground is prepared to guard conductor C1078.

Rotary magnet 1009 and relay 340 in allotter 300′ will intermittently operate to rotate the wipers 1096—1099 and vertical wiper 1091 one step for each interruption. When vertical wiper 1091 takes its first rotary step the ground thereon is removed. When the marked line circuit is found, EC wiper 1096 will find battery which will operate relay 360 in allotter 300′; the circuit extending from the battery on B.C.O. of the line circuit, EC wiper 1096, contacts 1021, conductor C1089, contacts 1077, conductor C304, contacts 354, lower winding of relay 360, to ground at contacts 335. Relay 360 operating closes contacts 362 to operate relay 365. Relay 365 operating closes contacts 366 to operate relay 1080 via conductor C307, and contacts 1073. Relay 1080 operates and at contacts 1081 and 1082 closes a loop circuit to the outgoing trunk. At contacts 1083 and 1084 locking circuits from the ground on conductor C304 are closed to relays 1020 and 1080. At contacts 1085 ground is closed to guard conductor C1078 to energize the motor magnet 315 and busy finder-connector 1000 to incoming calls. Motor magnet 315 will thus step its guard and start wipers to the next bank contact in a manner previously disclosed. Also, contacts 1087 open to deenergize the rotary magnet 1007.

The first selector was seized by finder-connector 1000 via finder-selector link 900 (Fig. 9); the circuit extending via negative conductor C1001, contacts 941, 921 and negative conductor C397 to the line relay in the selector, and back over positive conductor C938, contacts 923, 943 and positive conductor C1002. The seized first selector could be identical to selector 500 (Fig. 5) and further explanation is not considered necessary. It is necessary however that the first selector must provide dial tone and busy tone, and one of the remaining selectors in the switch train must provide ringing frequencies and ringback tone, whereby these necessities are provided from the main exchange. Further, the remaining equipment to complete the call could also be of the type previously mentioned.

The above explained operations were described to show the dual purpose of finder-connector 1000. That is, this switch can be used as either a finder or as a connector as previously described.

This invention has thus provided a plurality of apartment house suboffices with line equipment provided therein and a switch train in a main or parent exchange providing transmission battery, dial tone, busy tone, ringback tone, and a plurality of ringing frequencies for subscribers in said suboffices.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a main exchange, a plurality of suboffice exchanges, a selector-repeater in said main exchange, a plurality of connectors in each suboffice; a sequence switch, a ringing source connectable in said selector-repeater, and a switch-through relay in said selector-repeater, means for extending a loop circuit from a first of said suboffices to said selector-repeater, said sequence switch taking one step responsive to the termination of each series of digital impulses received by said selector-repeater, means in said selector-repeater for seizing an idle connector in a second of said suboffices responsive to the receipt of a first series of digital impulses, means in said selector-repeater for repeating a second and third series of digital impulses to said connector responsive to the receipt thereof, to cause said connector to engage with a predetermined called subscriber in said second suboffice, means responsive only to said sequence switch taking its third step for permitting the operation of said switch-through relay, said switch-through relay operating responsive only to an idle condition existing at said called subscriber for extending said loop circuit and said ringing source via said selector-repeater to said subscribers line via said connector.

2. In a telephone system as claimed in claim 1, including a dual source of transmission battery in said selector-repeater having a first source provided for said called subscriber responsive to answering the call, and a second source extendable back over said loop circuit to a calling subscriber.

3. In a telephone system, a main exchange, a plurality of suboffice exchanges, a selector-repeater in said main exchange, a plurality of connectors in each suboffice; a sequence switch, a ringing source, and a ring-back tone source in said selector-repeater; means for extending a loop circuit to said selector-repeater from a first of said suboffices, said sequence switch taking one step responsive to the termination of each series of digital impulses received by said selector-repeater, means in said selector-repeater for seizing an idle connector in a second of said suboffices responsive to the receipt of a first series of digital impulses, means in said selector-repeater for repeating a second and third series of digital impulses to said connector upon the receipt thereof to cause said connector to engage a predetermined called subscriber's line in said second suboffice, means responsive only to said sequence switch taking its third step for permitting the extension of said loop circuit to said connector and transmitting the ringing source and ring-back source to the called and calling subscribers respectively, and relay means in said engaged called subscribers line being found idle to extend said loop circuit to said connector and transmit the ringing source and ring-back source to said respective called and calling subscribers lines.

4. In a telephone system, a main exchange, a plurality of suboffice exchanges, a selector-repeater in said main exchange, a plurality of connectors in each suboffice; a sequence switch, a ringing source, a switch-through relay, and a busy-test relay in said selector-repeater, means for extending a loop circuit from a first of said suboffices to said selector-repeater, said sequence switch taking one step responsive to the termination of each series of digital impulses received by said selector-repeater, means in said selector-repeater for seizing an idle connector in a second of said suboffices responsive to the receipt of a first series of digital impulses, means in said selector-repeater for repeating a second and third series of digital impulses to said connector responsive to the receipt thereof to cause said connector to engage with a predetermined called subscriber in said second suboffice, means responsive only to said sequence switch taking its third step for permitting the operation of either said switch-through relay or said busy-test relay, said busy-test relay operating responsive only to an existing busy condition on said engaged called subscribers line to prevent the operation of said switch-through relay, and said switch-through relay operating responsive only to an idle condition existing on said engaged called line for extending said loop circuit and said ringing source to said subscribers line via said connector.

5. In a telephone system as claimed in claim 4, including a source of busy tone in said selector-repeater whereby a busy tone is transmitted back over said loop circuit to the calling end for notification of a busy condition responsive to the operation of said busy-test relay.

6. In a telephone system, a main exchange, a plurality of suboffice exchanges, a selector-repeater in said main exchange, a plurality of connectors in each suboffice, means for extending a loop circuit to said selector-repeater from a first of said suboffices, means in said selector-repeater for seizing a connector in a second of said suboffices responsive to the receipt of a first series of digital impulses, means responsive to the termination of said first series of digital impulses for extending a second loop circuit to said connector including a shunt thereon to prevent said connector from responding to a second series of digital impulses, means in said selector-repeater for choosing a predetermined ringing frequency therein responsive to the receipt of a second series of digital impulses, means responsive to the termination of said second series of digital impulses for removing said shunt from across said second loop circuit, repeating means in said selector-repeater for repeating a third and fourth series of digital impulses to said connector responsive to the receipt thereof to cause said connector to engage with a predetermined called subscriber's line, and means in said selector-repeater for extending said ringing frequency from said selector-repeater to said called subscriber's line only if said engaged line is found idle.

7. In a telephone system, a calling subscriber, a called subscriber, a selector-repeater, a plurality of connectors, a loop circuit, switching means responsive to digital impulses from said calling subscriber for extending said loop circuit to said selector-repeater, means in said selector-repeater for seizing one of said idle connectors responsive to a first series of digital impulses, a second loop circuit including a shunting means thereon extending to said connector responsive to the termination of said first series of digital impulses to prevent said connector from responding to a second series of digital impulses, means in said selector-repeater for choosing a predetermined ringing frequency therein responsive to the receipt of a second series of digital impulses, said shunting means disconnected from across said second loop circuit responsive to the termination of said second series of digital impulses, repeating means in said selector-repeater for repeating a third and fourth series of digital impulses into said connector for causing said connector to engage said called line, and means in said selector-repeater for extending said predetermined ringing frequency from said selector-repeater to said called line if said engaged line is found idle, and means in said selector-repeater for extending said first loop circuit to said connector only upon said called party answering the call.

8. In a telephone system as claimed in claim 7, including a source of busy tone in said selector-repeater, whereby if said called line is found busy said busy tone is transmitted back over said first loop circuit to said calling party from said selector-repeater without extending said first loop circuit to said connector.

9. In a telephone system, a main exchange, a plurality of suboffice exchanges, a selector-repeater in said main exchange, a plurality of connectors in each suboffice, a sequence switch in said selector-repeater, means for extending a loop circuit to said selector-repeater from a first of said suboffices, said sequence switch taking one step responsive to the termination of each series of digital impulses received by said selector-repeater, means in said selector-repeater for seizing an idle connector in a second of said suboffices responsive to the receipt of a first series of digital impulses, shunting means imposed to prevent said connector from responding to a second series of digital impulses responsive to said sequence switch taking its first step, means in said selector-repeater responsive to the receipt of a second series of digital impulses for choosing a predetermined ringing frequency, said shunting means removed responsive to said sequence switch taking its second step, means in said selector-repeater for repeating a third and fourth series of digital impulses to said connector responsive to the receipt thereof, to cause said connector to engage with a predetermined called subscriber's line in said second suboffice, means responsive only to said sequence switch taking its fourth step for permitting the extension of said loop circuit and said ringing frequency to said connector.

10. In a telephone system, a main exchange, a plurality of suboffice exchanges, a selector-repeater in said main exchange, a plurality of connectors in each suboffice, a switch-through relay in said selector-repeater, means for extending a loop circuit to said selector-repeater from a first of said suboffices, means in said selector-repeater for seizing a connector in a second of said suboffices responsive to the receipt of a first series of digital impulses, means responsive to the termination of said first series of digital impulses for extending a second loop circuit to said connector from said selector-repeater including a shunt thereon to prevent said connector from responding to a second series of digital impulses, means in said selector-repeater for choosing a predetermined ringing frequency responsive to the receipt of a second series of digital impulses, means responsive to the termination of said second series of digital impulses for removing said shunt from across said second loop circuit, means in said selector-repeater for repeating a third and fourth series of digital impulses to said connector responsive to the receipt thereof to cause said connector to engage with a predetermined called subscriber's line in said second suboffice, and said switch-through relay operated responsive to said called subscriber's line found to be idle for extending said ringing frequency thereto and extending said first loop circuit to said connector.

11. In a telephone system, a main exchange, a plurality of suboffice exchanges, a selector-repeater in said main exchange, a plurality of connectors in each suboffice, a sequence switch and a switch-through relay in said selector-repeater, means for extending a loop circuit to said selector-repeater from a first of said suboffices, said sequence switch taking one step responsive to the termination of each series of digital impulses received by said selector-repeater, means in said selector-repeater for seizing an idle connector in a second of said suboffices responsive to the receipt of a first series of digital impulses, shunting means imposed to prevent said connector from responding to a second series of digital impulses responsive to said sequence switch taking its first step, means in said selector-repeater responsive to the receipt of a second series of digital impulses for choosing a predetermined ringing frequency, said shunting means removed responsive to said sequence switch taking its second step, means in said selector-repeater for repeating a third and fourth series of digital impulses to said connector responsive to the receipt thereof, for engaging said connector with a predetermined called subscriber's line in said second suboffice, said switch-through relay being permitted operation responsive only to said sequence switch taking its fourth step, and said loop circuit and said ringing frequency being extended to said connector responsive only to the operation of said switch-through relay.

12. In a telephone system, a main exchange, a plurality of suboffice exchanges, a selector-repeater in said main exchange, a plurality of connectors in each suboffice, a sequence switch and a switch-through relay in said selector-repeater, means for extending a loop circuit to said selector-repeater from a first of said suboffices, said sequence switch taking one step responsive to the termination of each series of digital impulses received by said selector-repeater, means in said selector-repeater for seizing an idle connector in a second of said suboffices responsive to the receipt of a first series of digital impulses, shunting means imposed to prevent said connector from responding to a second series of digital impulses to said sequence switch taking its first step, means in said selector-repeater responsive to the receipt of a second series of digital impulses for choosing a predetermined ringing frequency, said shunting means removed responsive to said sequence switch taking its second step, means in said selector-repeater for repeating a third and fourth series of digital impulses to said connector responsive to the receipt thereof for causing said connector to engage with a predetermined called subscriber's line in said second suboffice, said switch-through relay being permitted operation responsive only to said sequence switch taking its fourth step, and said switch-through relay operating only if said called subscriber's line is found idle to extend said loop circuit to said connector and extend said ringing frequency to said called subscriber's line.

13. In a telephone system, a main exchange, a plurality of suboffice exchanges, a selector-repeater in said main exchange, a plurality of connectors in each suboffice, a switch-through and a busy-test relay in said selector-repeater, means for extending a loop circuit to said selector-repeater from a first of said suboffices, means in said selector-repeater for seizing a connector in a second of said suboffices responsive to the receipt of a first series of digital impulses, means responsive to the termination of said first series of digital impulses for extending a second loop circuit to said connector from said selector-repeater including a shunt thereon to prevent said connector from responding to a second series of digital impulses, means in said selector-repeater for choosing a predetermined ringing frequency responsive to the receipt of a second series of digital impulses, means responsive to the termination of said second series of digital impulses for removing said shunt from across said second loop circuit, means in said selector-repeater for repeating a third and fourth series of digital impulses to said connector responsive to the receipt thereof to cause said connector to engage a predetermined called subscriber's line in said second suboffice, said busy-test relay operating responsive to a busy condition existing on said called line to prevent the operation of said switch-through relay and return busy tone back over said first loop circuit, and said switch-through relay operated responsive to an idle condition of said engaged called subscriber's line for extending said ringing frequency thereto and extending said first loop circuit to said connector.

14. In a telephone system as claimed in claim 13, including a dual source of transmission battery in said selector-repeater having a first source provided for said called subscriber responsive to answering the call, and a second source extendable back over said loop circuit to a calling subscriber.

15. In a telephone system, a main exchange, a plurality of suboffice exchanges, a selector-repeater in said main exchange, a plurality of connectors in each suboffice, a sequence switch and a minor switch in said selector-repeater, means for extending a loop circuit from a first of said sub-offices to said selector-repeater, said sequence switch taking one step responsive to the termination of each series of digital impulses received by said selector-repeater, means in said selector-repeater for seizing an idle connector in a second of said suboffices responsive to the receipt of a first series of digital impulses, shunting means imposed to prevent said connector from responding to a second series of digital impulses and a circuit completed to said minor switch responsive to said sequence switch taking its first step, said minor switch stepping to choose a predetermined ringing frequency in accordance with the numerical value and receipt of a second series of digital impulses, means in said selector-repeater for repeating a third and fourth series of digital impulses to said connector responsive to the receipt thereof, to cause said connector to engage with a predetermined called subscriber in said second suboffice, means responsive only to said sequence switch taking its fourth step for permitting the extension of said loop circuit and said ringing frequency to said connector.

16. In a telephone system, a main exchange, a plurality of suboffice exchanges, a selector-repeater in said main exchange, a plurality of connectors in each suboffice; a sequence switch, a switch-through relay and a busy-test relay in said selector-repeater, means for extending a loop circuit to said selector-repeater from a first of said suboffices, said sequence switch taking one step responsive to the termination of each series of digital impulses received by said selector-repeater, means in said selector-repeater for seizing an idle connector in a second of said suboffices responsive to the receipt of a first series of digital impulses, shunting means imposed to prevent said connector from responding to a second series of digital impulses responsive to said sequence switch taking its first step, means in said selector-repeater responsive to the receipt of a second series of digital impulses for choosing a predetermined ringing frequency, said shunting means removed responsive to said sequence switch taking its second step, means in said selector-repeater for repeating a third and fourth series of digital impulses to said connector responsive to the receipt thereof for causing said connector to engage a predetermined called subscriber's line in said second suboffice, said switch-through relay and said busy-test relay being permitted operation responsive only to said sequence switch taking its fourth step, said busy-test relay operating responsive to a busy condition existing on said engaged called line to prevent the operation of said switch-through relay and extend busy tone back over said loop circuit, and said switch-through relay operating responsive to an idle condition of said engaged called line to extend said ringing frequency thereto and extend said loop circuit to said seized connector.

17. In a telephone system, a main exchange, a plurality of suboffice exchanges, a selector-repeater in said main exchange, a plurality of connectors in each suboffice; a sequence switch, a minor switch, and a switch-through relay in said selector-repeater, means for extending a loop circuit from a first of said suboffices to said selector-repeater, said sequence switch taking one step responsive to the termination of each series of digital impulses received by said selector-repeater, means in said selector-repeater for seizing an idle connector in a second of said suboffices responsive to the receipt of a first series of digital impulses, shunting means imposed to prevent said connector from responding to a second series of digital impulses and a circuit completed to said minor switch responsive to said sequence switch taking its first step, said minor switch stepping to choose a predetermined ringing frequency in accordance with the numerical value and receipt of a second series of digital impulses, means in said selector-repeater for repeating a third and fourth series of digital impulses to said connector responsive to the receipt thereof to cause said connector to engage a predetermined called subscriber in said second suboffice, said switch-through relay being permitted operation responsive only to said sequence switch taking its fourth step, and said switch-through relay operating responsive only to said called subscriber being found idle to extend said loop circuit to said seized connector and extend said ringing frequency to said called subscriber.

18. In a telephone system, a main exchange, a plurality of suboffice exchanges, a source of high voltage in said main exchange, a finder and connector common to a plurality of subscriber lines in one of said suboffices, releasing means in said finder controlled by a high resistance neon tube, means for extending a first connection from one of said subscriber's lines in said suboffice to said main exchange via said finder, means for extending a surge of said high voltage over said first connection to said neon tube to initiate the operation of said releasing means to release said finder responsive to the termination of said call, means for extending a second connection from said main exchange to said connector via said finder, means for extending a surge of said high voltage over said second connection to said neon tube to initiate the operation of said releasing means to release said connector responsive to the termination of said second call.

19. In a telephone system, a main exchange, a suboffice exchange, a two way finder-selector link in said main exchange containing a source of high voltage therein, a finder and connector in said suboffice common to a plurality of subscriber lines, releasing means in said finder controlled by a neon tube therein, means for extending a call connection in a first direction from said finder and through said finder-selector link, means for returning a surge of said high voltage to momentarily operate said neon tube responsive to the termination of said call, said releasing means operative responsive to the momentary operation of said neon tube to release said finder, means for extending a call in a second direction through said finder-selector link, through said finder to said connector, means for extending said surge of high voltage to momentarily operate said neon tube responsive to the termination of said second call, said releasing means operative responsive to the momentary operation of said neon tube to restore said connector.

20. In a telephone system, a main exchange, a plurality of suboffice exchanges, a finder and a connector common to a plurality of subscriber lines in each suboffice, a two way finder-selector link and a plurality of selectors in said main exchange said finder-selector link seizable in a first direction by a first of said selectors for extending a connection to said connector via said finder, releasing means in said finder controlled by a high resistance neon tube, a source of high voltage in said finder-selector link, means for extending a surge of said high voltage to said neon tube to initiate the release of said connector responsive to the termination of a call in said first direction, means for extending a loop circuit from one of said finders to a second of said selectors via said finder-selector link in a second direction upon the initiation of a call by one of said subscribers, means for returning said surge of high voltage to said neon tube to initiate the release of said finder responsive to the termination of said call in said second direction.

21. In a telephone system, a main exchange, a suboffice exchange, a finder-selector link in said main exchange, said finder-selector link in said main exchange containing a source of high voltage therein, a finder and connector in said suboffice common to a plurality of subscriber lines, releasing means in said finder controlled by a neon tube therein, means for extending a first directional call connection by one of said subscribers from said finder and through said finder-selector link, means for extending a surge of said high voltage back over said first directional connection to break down said neon tube responsive to the termination of said call, said releasing means operative responsive to the breaking down of said neon tube to release said finder, means for extending a second directional call connection through said finder-selector link to said connector via said finder, means for extending said surge of high voltage over said second directional connection to break down said neon tube responsive to the termination of said call, said releasing means operative responsive to the break down of said neon tube to release said connector.

References Cited in the file of this patent

UNITED STATES PATENTS

| | | |
|---|---|---|
| 2,187,478 | Wochinger | Jan. 16, 1940 |
| 2,214,203 | Peterson | Sept. 10, 1940 |
| 2,476,888 | Mitchell | July 19, 1949 |
| 2,804,503 | Cotroneo | Aug. 27, 1957 |